United States Patent [19]
Kott

[11] Patent Number: 5,343,211
[45] Date of Patent: Aug. 30, 1994

[54] PHASED ARRAY ANTENNA WITH WIDE NULL

[75] Inventor: Michael A. Kott, Medford, N.J.

[73] Assignee: General Electric Co., Moorestown, N.J.

[21] Appl. No.: 644,358

[22] Filed: Jan. 22, 1991

[51] Int. Cl.⁵ .............. G01S 3/16; G01S 5/02
[52] U.S. Cl. ............... 342/379; 342/381; 342/424
[58] Field of Search ........... 342/379, 381, 384, 424

[56] References Cited

U.S. PATENT DOCUMENTS

| | | | |
|---|---|---|---|
| 3,277,480 | 10/1966 | Gardner | 342/373 |
| 3,435,453 | 3/1969 | Howard | 342/383 |
| 3,763,490 | 10/1973 | Hardley et al. | 342/375 |
| 3,876,947 | 4/1975 | Giraudon | 455/234 |
| 3,900,874 | 8/1975 | Larkin et al. | 342/91 |
| 3,916,408 | 10/1975 | Evans et al. | 342/379 |
| 4,044,359 | 8/1977 | Applebaum et al. | 342/379 |
| 4,051,474 | 9/1977 | Mack et al. | 342/362 |
| 4,070,675 | 1/1978 | Daniel et al. | 342/380 |
| 4,075,633 | 2/1978 | Lewis | 342/381 |
| 4,107,682 | 8/1978 | Boucher et al. | 342/17 |
| 4,190,837 | 2/1980 | Salvaudon et al. | 342/17 |
| 4,214,244 | 7/1980 | McKay et al. | 342/17 |
| 4,359,738 | 11/1982 | Lewis | 342/379 |
| 4,549,183 | 10/1985 | Farina | 342/17 |
| 4,586,045 | 4/1986 | Downie | 342/17 |
| 4,672,378 | 6/1987 | Drabowitch et al. | 342/17 |

FOREIGN PATENT DOCUMENTS 0145406  9/1982  Japan ............... 342/379

Primary Examiner—Gregory C. Issing
Attorney, Agent, or Firm—William H. Meise; C. A. Nieves; S. A. Young

[57] ABSTRACT

An antenna subject to standoff sidelobe barrage jamming exhibits a null in its sidelobe structure at a selectable elevation angle for all azimuth angles of interest. The null can be set to the elevation angles corresponding to the angle of the standoff jammers. The null is generated with the aid of an interferometer associated with each column of the antenna array. The interferometer produces a pattern having a plurality of lobes. The interferometer pattern is phased and amplitude adjusted relative to the antenna pattern of its associated column line array so that subtraction of the patterns causes one or more sidelobe of the antenna pattern to be at least partially canceled. An azimuth beamformer combines the elevation patterns of a plurality of column arrays, each connected to its own interferometer, to produce a pencil beam with a sidelobe structure exhibiting a null at the particular elevation angle.

4 Claims, 28 Drawing Sheets

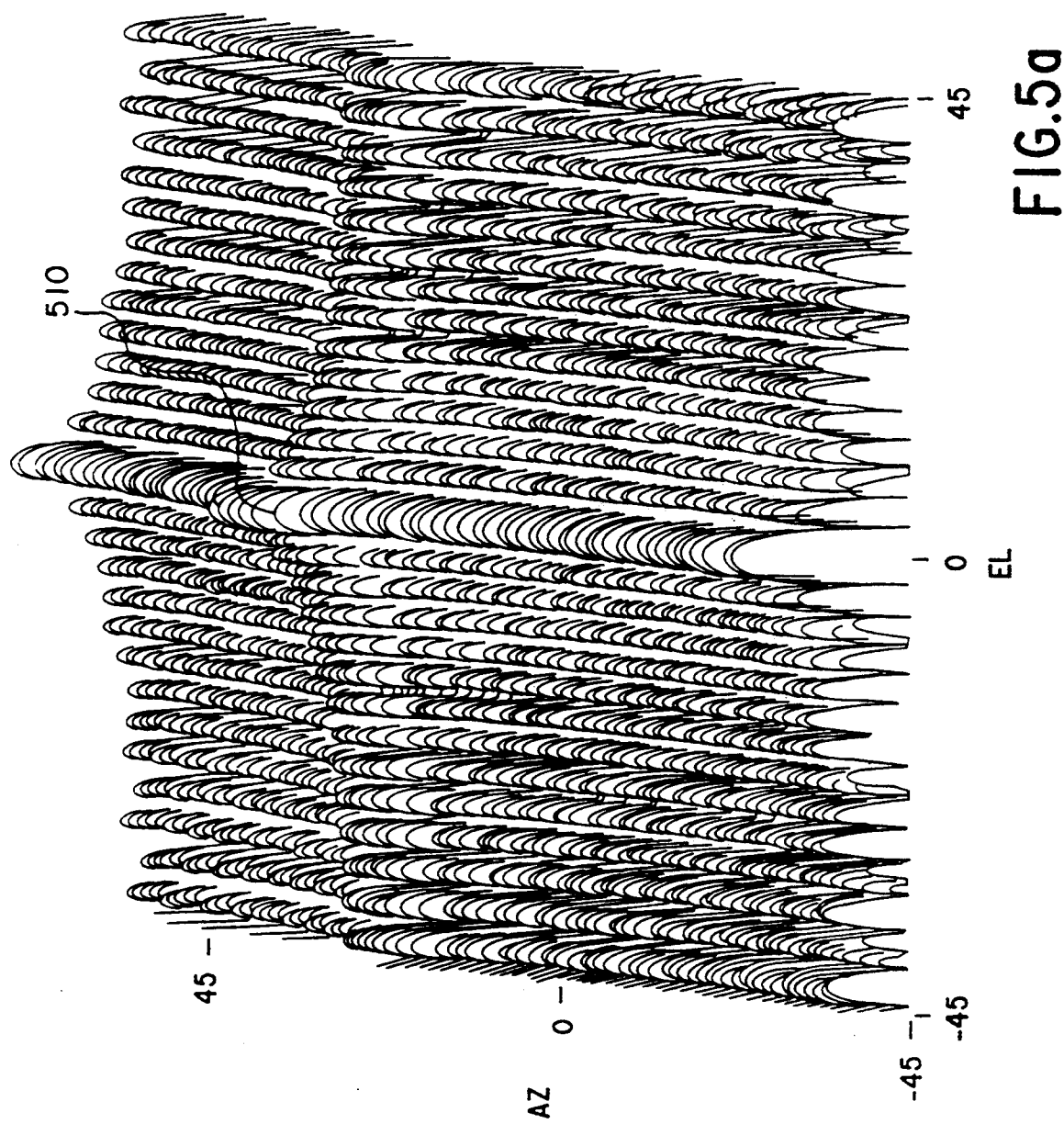

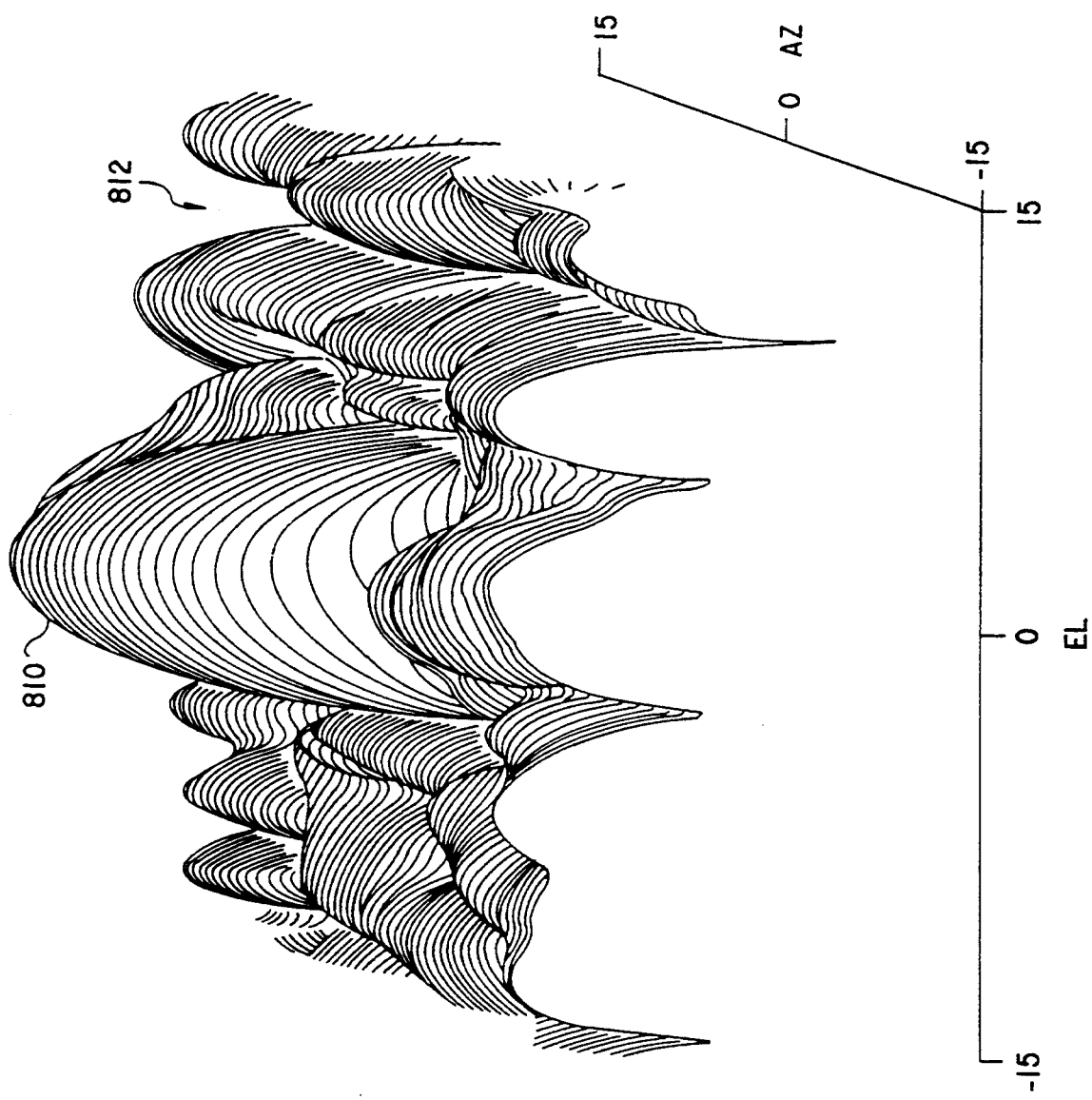

PHASED ARRAY ANTENNA WITH WIDE NULL

This invention relates to phased-array antenna systems, and more particularly to the hulling of such antennas in particular directions for reduction of the effects of hostile jamming.

Radar and communications systems are important for surveillance, control and missile guidance under wartime conditions. Various countermeasures have come into use, including the use of sources of high power electromagnetic interference (Jammers) intended to disrupt the function of the radar and or communication systems of an opposing military force. The potential use of jammers has led to the adoption of anti-jamming schemes which are used in conjunction with the radar or communications systems. Anti-jamming schemes include pulse coding and frequency diversity. These schemes are reasonably effective, and their adoption may occasion resort by an opposing party to the use of a large number of airborne standoff sidelobe barrage jammers.

Standoff sidelobe barrage jamming is performed by large numbers of aircraft circling or following an elongated "racetrack" path at a sufficient distance from the radar to be safe from antiaircraft countermeasures, with each of the aircraft emitting broadband, high power noise. Such barrage jammers exploit a particularly vulnerable aspect of radar and communications equipment, namely the antenna radiation pattern, which generally exhibits sidelobes which allow the antenna to receive jamming signals regardless of the direction from which the jamming signals arrive at the antenna. The jamming signals received by way of an antenna sidelobe cannot readily be distinguished from the desired signals entering the principal beam of the antenna.

Various schemes have been devised for adjusting the net antenna radiation pattern to reduce the amplitude of (null) the signals from the jammer. The simplest scheme is to use antennas with very low sidelobe levels. However, such antennas tend to be large for the amount of gain which they provide, because of the aperture amplitude tapering required for low sidelobes. Large antennas are disadvantageous for many military purposes.

Another scheme uses one or more adaptive sidelobe cancelers, which include one or more relatively low gain auxiliary antenna(s) interconnected with the main antenna by a control scheme which combines the signals received by the auxiliary and main antennas to cause partial or complete cancellation of the net signal received from the direction of the jammer. The general operation of a sidelobe canceling system may be understood by referring to FIG. 1a in conjunction with FIG. 1b. FIG. 1a represents an idealized amplitude vs. angle plot or radiation pattern of an antenna such as a reflector-type or array antenna, which may be used by a radar or communication system. In FIG. 1a, the high-gain main beam is designated 10, and 12, 14 and 16 designate some of the sidelobes. Such sidelobes tend to be relatively large in amplitude at angles near the main beam, and relatively smaller in amplitude at large angles from the main beam. FIG. 1b illustrates as 18 a corresponding plot of the radiation pattern of a low-gain antenna which may be located adjacent the antenna of FIG. 1a. As illustrated, pattern 18 is relatively broad. When a sidelobe canceling system adjusts the amplitude and phase of a signal received by radiation pattern 18 of FIG. 1b in order to cancel an unwanted signal received by, for example, sidelobe 12 of the pattern of FIG. 1a, the effect is to add the radiation patterns of FIGS. 1a and 1b. While the particular phase and amplitude which are selected for the addition of the radiation patterns may result in substantial cancellation of sidelobe 12 of FIG. 1a, they ordinarily result in an increase in the amplitude, and a change in the position of at least some of the other sidelobes, such as sidelobe 16. U.S. Pat. No. 3,435,453 issued Mar. 25, 1969 in the name of Howard, U.S. Pat. No. 3,763,490 issued Oct. 2, 1973 in the name of Hadley et al., U.S. Pat. No. 3,876,947 issued Apr. 8, 1975, U.S. Pat. No. 3,916,408 issued Oct. 28, 1975 in the name of Evans etal., U.S. Pat. No. 4,044,359 issued Aug. 23, 1977 in the name of Appelbaum etal. describe various sidelobe cancellation schemes.

One such control system is required for each jammer. In the standoff barrage jamming scenario, a sufficiently large number of jamming aircraft could be used so as to exceed the number of control circuits, with the result that the radar would have no defense against one or more of the sidelobe jammers. When a plurality of sidelobe cancelers operate in a radar or other system to counteract sidelobe barrage jamming, the locations of the jammers change continuously, so each sidelobe canceler must in general change amplitude and phase to track its own jammer. In so tracking, each side lobe canceler changes the net sidelobe structure of the system, causing all the other sidelobe canceling systems to readjust not only in response to their own moving jammers, but also to the changing sidelobe structure of the net radiation pattern. These types of sidelobe cancelers require large amounts of complex, real time, adaptive signal processing. Their implementation for more than a few jammers may be both impractical and prohibitively expensive.

A less costly and complex system for reducing the effects of standoff sidelobe barrage jammers is desired.

SUMMARY OF THE INVENTION

It has been discovered that standoff sidelobe barrage jammers tend to remain at a relatively constant elevation relative to the antenna under consideration. According to the invention, an interferometer associated with the antenna generates an elevation pattern including a plurality of lobes of approximately equal amplitude. The patterns of the antenna and of the interferometer are subtracted, and the interferometer is adjusted so that one of its lobes "overlies" that sidelobe(s) of the antenna which is directed toward the elevation angle from which Jamming may be expected, with the result that an elevation null is formed at or near that angle in the net radiation pattern. Since the net radiation pattern has a null at that elevation angle for substantially all azimuth angles of interest, the jamming signals from all jammers are rejected.

DESCRIPTION OF THE DRAWING

FIGS. 1a, 1b and 1c are together referred to as FIG. 1;

FIGS. 3a, 3b and 3c are together referred to as FIG. 3;

FIG. 5a illustrates in perspective or isometric view a computer-generated (simulated) three-dimensional plot of the radiation pattern formed by the structure of FIG. 4 when interferometer cancellation is not used.

FIG. 2f is a similar cut at 10.5° elevation angle;

FIG. 8b is a similar plot with a null according to the invention at an elevation angle of about 10°.

DESCRIPTION OF THE INVENTION

Standoff jamming aircraft are expected to cruise at attitudes of 10 to 15 kilometers (km) at ranges of 150 to 450 km from the victim equipment. At those altitudes and ranges, the subtended vertical angle is about 0.25° to 2° elevation, although the azimuth angle over which the jammers operate might be 50° to 90° (or more). Friendly airborne radars looking down for low-flying cruise missiles or aircraft will tend to direct their beams below the elevation angle of the hostile jamming racetrack. Friendly ground-based or airborne radars looking up to detect tactical ballistic missiles and high-flying cruise missiles or aircraft will tend to direct their beams at elevation angles above the elevation angle of the jamming racetrack. In both cases, the beams will tend to be directed only a few beamwidths above or below the jamming racetrack, so the jamming signals will enter the system on antenna sidelobes near the main lobe. Under these conditions, a sidelobe null subtending only a few degrees in elevation and up to 90° (or more) in azimuth would tend to reduce the effectiveness of the jamming. Such a null might need to be moved slowly in elevation as the elevation angle between the victim equipment and the jammer changed, but would not need to be moved in azimuth.

Figure 1A:
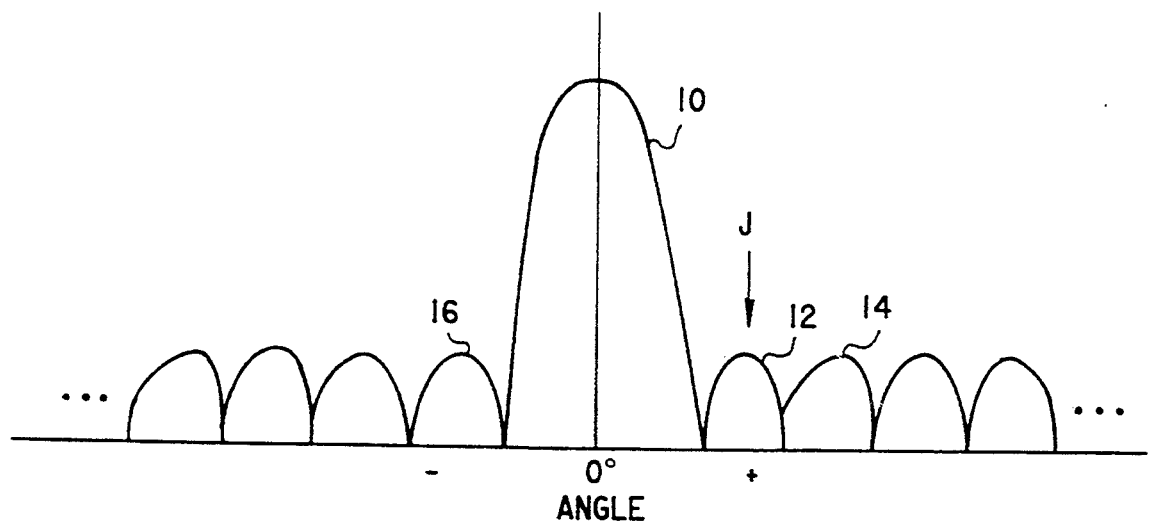
FIG. 1a is an idealized amplitude versus angle antenna radiation pattern including a main beam and plural sidelobes.
Figure 1B:
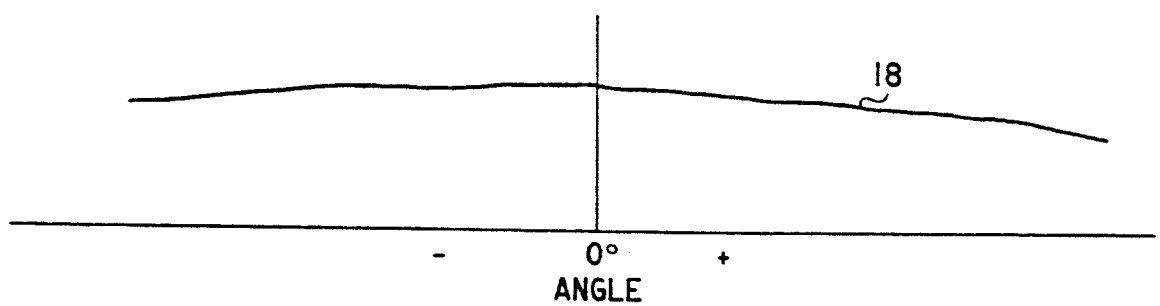
FIG. 1b represents a corresponding idealized radiation pattern of a relatively low-gain antenna.
Figure 1C:
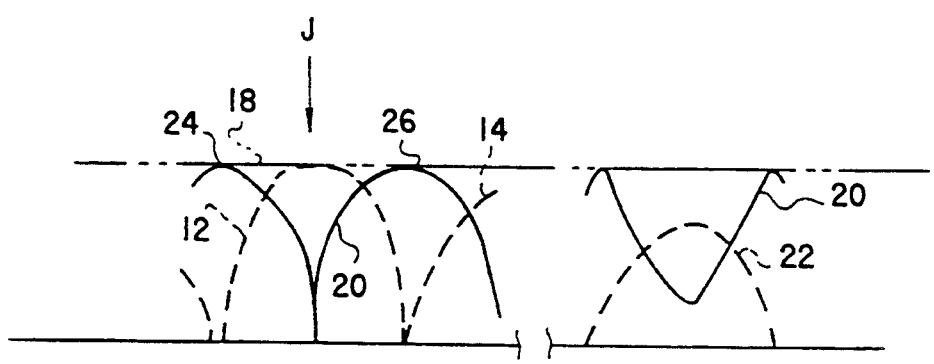
FIG. 1C illustrates the effect on a sidelobe portion of the pattern of FIG. 1a of adjusting the amplitude and phase of the pattern of FIG. 1b to cancel a portion of a sidelobe of FIG. 1a in accordance with a prior-art method.

Referring to FIG. 1c, the pattern of radiation sidelobes 12 and 14 of FIG. 1a is illustrated as a dash line 12, 14, and radiation pattern 18 of FIG. 1b is illustrated by dot-dash line 18. As mentioned, a prior art sidelobe canceler adjusts the amplitude and phase of signals received by the antenna represented by radiation pattern 18, and adds it to signals received, as at arrow J of FIG. 1a, by sidelobe 12 of the antenna represented by the radiation pattern of FIG. 1a. Put more simply, radiation pattern 18 of FIG. 1b is adjusted in amplitude and phase to cancel or null the response of sidelobe 12 of FIG. 1a at the location of vector or arrow J. While this simple formulation is a convenient shorthand, it must be remembered that it is the signals which are actually canceled, and that the "radiation pattern" does not exist in the absence of signals.

In FIG. 1c, the amplitude of response 18 is set equal to the response of sidelobe 12 at arrow J, which happens to be the peak of the sidelobe. The patterns are subtracted (added 180° out-of-phase), with the net result illustrated by null pattern 20. A sharp null occurs at the precise point of cancellation, but the net response includes peak levels such as 24 and 26, at the locations of the nulls between sidelobes of the original pattern of FIG. 1a. Thus, once the prior art sidelobe canceler operates, jamming sources which were previously in a null of the sidelobes might become a significant source of interference.

Figure 2:
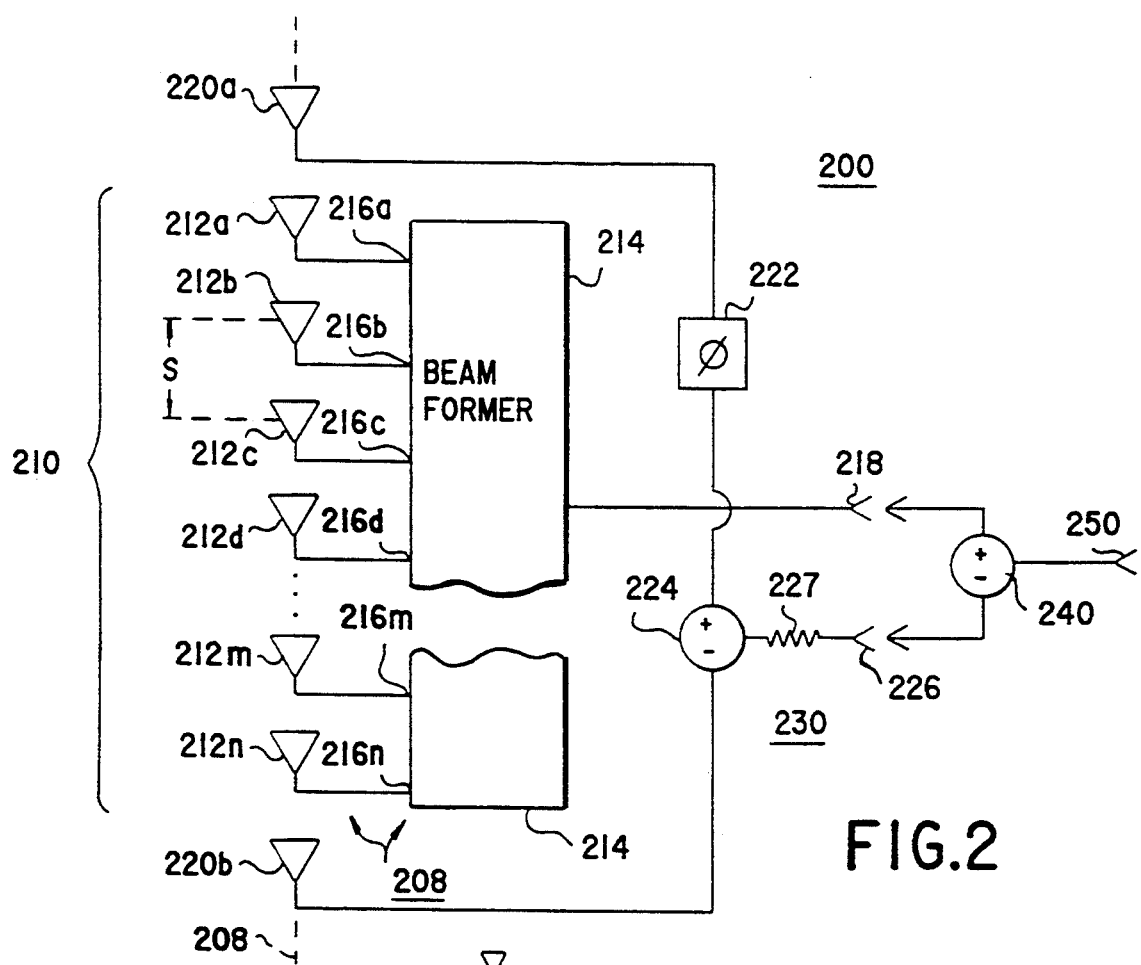
FIG. 2 is a simplified block diagram of a line array of antennas and a beamfoyer, together defining an antenna array, which array is coupled to an interferometer in accordance with the invention.

FIG. 2 illustrates a combination, designated generally as 200, which includes a line array 210 of a plurality of N antenna elements 212a, 212b, 212c . . . 212n, with a regular element-to-element spacing of S. Spacings are measured between antenna phase centers. In general, spacing S is less than one-half wavelength ($\lambda/2$) at the frequency of operation, although for some purposes, as in a thinned array, the spacing between at least some elements may exceed $\lambda/2$. A column beamformer 214 includes plural distal or separate ports 216a, 216b, 216c . . . 216n and a common or combined port 218. Each distal port of beamformer 214 is coupled to an antenna element 212, as for example distal port 216a is coupled to antenna element 212a. The combination of beamformer 214 with line array 210 forms an array antenna designated generally as 208. Column beamformer 214 may include a controllable phase shifter (not illustrated) associated with each distal port, and various transmission lines, amplifiers, attenuators and combiners (also not illustrated), all as well known in the art and as described, for example, in U.S. Pat. application Ser. No. 07/481,415 filed Feb. 20, 1990 in the name of Agrawal etal. Column beamformer 214 combines the signals received by each antenna element 212a through 212n with phase shifts and weights as required to produce at its output port 218 a net radiation pattern (antenna pattern) which is directive in an elevation plane.

Those skilled in the art of antennas know that antennas, beamformers and the like are reciprocal devices which operate in the same manner in both transmitting and receiving modes of operation. The words used to describe their operation may relate to either of the transmission or reception modes, with the other mode of operation being understood therefrom.

Those skilled in the art of antennas also know that the net pattern produced by array antenna 208 (line array 210 of FIG. 2 in conjunction with beamformer 214) is actually a product of the radiation pattern of the individual antennas 212 multiplied by the array pattern, and also know that when the array includes a large number of elements, the array factor predominates. Thus, the directive nature of the individual antenna elements is often inconsequential to the net radiation pattern and they may be assumed for simplicity to be omnidirectional. Thus, vertical line array 210 and beamformer 24 of FIG. 2 in principle produce a net radiation pattern which is omnidirectional in azimuth. Practical limitations such as the mounting structure upon which the array is mounted and the reduction of gain or nulls in the actual directivity patterns of the array elements generally limit the region of interest to much less than a hemisphere, as for example $\pm 45°$ from the boresight, although this will vary from application to application.

Figure 3A:
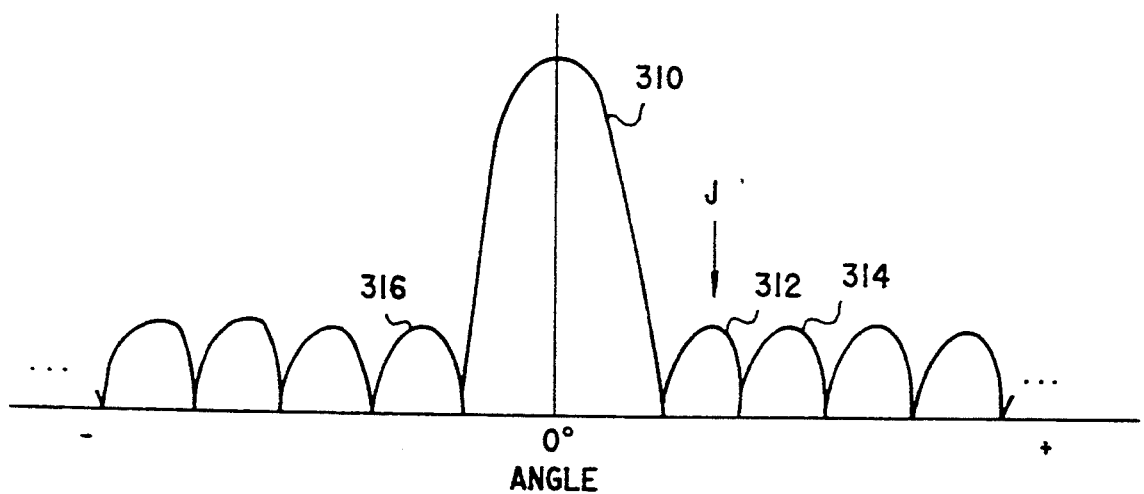
FIG. 3a is an idealized amplitude versus angle radiation pattern which might be associated with the antenna array of FIG. 2.

FIG. 3a is a plot of an idealized elevation radiation pattern of line array 210 as measured at combined output port 218 of beamformer 214 of FIG. 2. As illustrated in FIG. 3a, a directive beam 310 is associated with a plurality of sidelobes, some of which are designated 312, 314 and 316. If the phase shifters (not separately illustrated) within beamformer 214 are adjusted to move main antenna beam 310 to an elevation angle other than 0°, the sidelobe structure generally follows main beam 310. In general, the sidelobes have the same spatial frequency, except the sidelobes closest to the main beam 310, which have a higher spatial frequency (narrower width).

Referring once again to FIG. 2, combination 200 in accordance with an aspect of the invention is associated with two further antenna elements 220a and 220b, which are spaced apart by a distance which is greater than spacing S. The spacing of further antenna element 220a from antenna element 212a may equal S, and the spacing of antenna element 220b from antenna element 212n may also equal S. Antenna elements 220a and 200b are interconnected with a controllable phase shifter 222 and a differencing or subtracting circuit 224 to define an interferometer designated generally as 230. The structure is termed an "interferometer" because of the similarity of its concept and radiation pattern to those of an optical interferometer. While termed an interferometer, antennas 220a and 220b form an array, and subtractor 224 is in effect a beamformer for an antenna array including antenna elements 220 and 220b. The combined output of subtractor 224 appears at port 226.

Figure 3B:
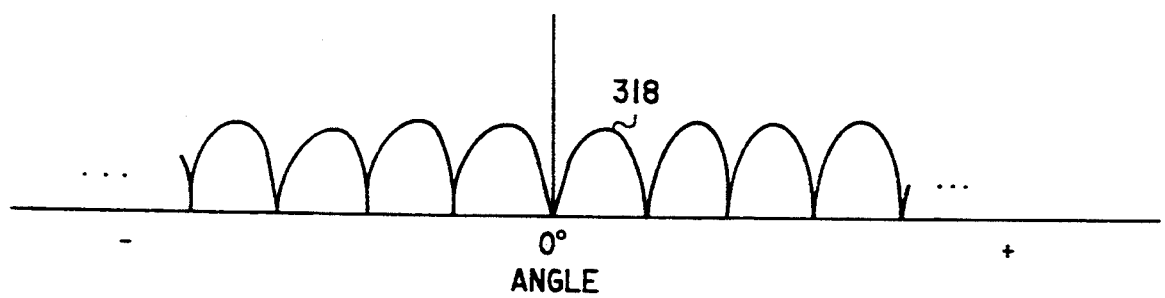
FIG. 3b is an idealized radiation pattern which might be associated with the interferometer of FIG. 2.

FIG. 3b illustrates as plot 318 the radiation pattern produced at port 226 by interferometer 230 of FIG. 2. Pattern 318 includes a plurality of lobes of approximately equal amplitude, although as mentioned the actual pattern may be modified by the radiation pattern of the antenna elements because the number of antenna elements in the interferometer array is small. Other factors also affect the pattern. When antenna elements 220a and 220b of the interferometer are located approximately as described, the spatial frequency or period of the lobes of pattern 318, as measured by the angle between adjacent nulls, tends to be similar to the corresponding spatial frequency or period of the sidelobes of the radiation pattern of array antenna 208 of FIG. 2 (except the sidelobe on each side closest to the main beam on each side for certain illumination functions). Phase shifter 222 of FIG. 2 may be adjusted to "move" the lobes of interference pattern 318 in elevation, which corresponds to right-left movement in FIG. 3b. Attenuator 227 of FIG. 2 may be adjusted to control the amplitude of the interference pattern lobes.

Figure 3C:
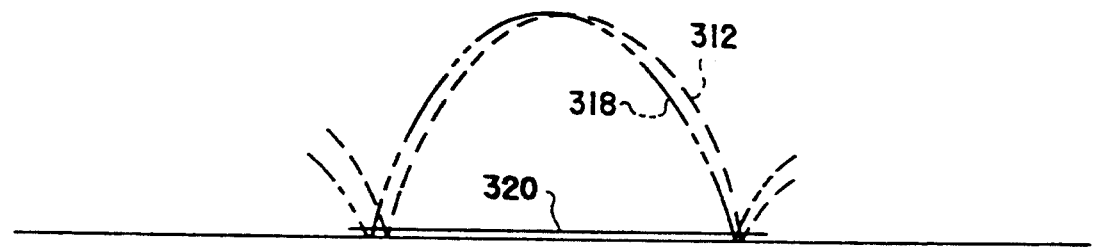
FIG. 3c illustrates the effect on a sidelobe portion of the pattern of FIG. 3a of adjusting the amplitude and phase of the pattern of FIG. 3b to cancel a sidelobe of FIG. 3a in accordance with an aspect of the invention.

Referring again to FIG. 2, a subtracting circuit 240 has its noninverting (+) input coupled to port 218 and its inverting (−) input port coupled to port 226. Subtracting circuit 240 takes the difference between the pattern produced by array antenna 208 and the adjusted pattern produced by interferometer 230. FIG. 3c illustrates array pattern sidelobe 312 as a dotted line, with a lobe of interference pattern 318 adjusted to be superimposed thereupon. Their similarity is great enough so that they have been slightly offset in FIG. 3c for clarity. The interference lobe when subtracted from the array pattern can substantially cancel the sidelobe, as suggested by resultant pattern 320. Those skilled in the art realize that an amplitude adjustment may be required for best results, since the amplitude of the interference lobe may not match that of the array sidelobe to be canceled. Unlike the cancellation produced by a conventional sidelobe canceler as illustrated in FIG. 3a, the cancellation using an interferometer lobe can in principle cancel one or more sidelobes, unlike the prior art in which cancellation of only a part of a sidelobe is possible. Practical considerations limit the range of cancellation, but the potential width of cancellation according to the invention exceeds that achievable by ordinary sidelobe cancellation.

When beamformer 214 of FIG. 2 is adjusted to move main antenna beam 310 of FIG. 3a to elevation angles other than 0°, as mentioned, the elevation angles of sidelobes such as sidelobe 312 move with the main beam. This does not necessarily mean that the interferometer sidelobe must move to maintain a null at a particular elevation angle. For example, if the antenna pattern of FIG. 3a receives a signal from a jammer on sidelobe 312, as represented by arrow J, movement of main beam 310 to the left by one-half a sidelobe width causes jammer signal J to fall into a null between sidelobes, so no cancellation is necessary. Simply leaving interference pattern 318 in place will result in cancellation when further scanning of main beam 310 to the left brings sidelobe 314 into congruence with the position occupied by sidelobe 312 in FIG. 3. Naturally, best performance results when all factors are optimized at each scan angle, including the position of the interference lobes.

As so far described, array antenna 208 and interferometer 230 of FIG. 2 produce a beam which is directive in a plane including array axis 209, and which is otherwise omnidirectional in principle. A relatively broad null occurs in the region of a canceled sidelobe, i.e., at some selected elevation angle. The function of the invention for reduction of net antenna response (hulling) at a particular elevation angle has a particular advantage in the presence a plurality of standoff sidelobe barrage jammers, because the elevation angle at which the elevation null is set may be selected to equal the elevation angle at which all the jammers appear to be located. Since the width of the null is relatively broad, all jammers at that elevation are rejected.

It should be emphasized that the term "elevation" as applied to array 210 could as easily be "horizontal", because the invention also has an advantage if antenna array 210 of FIG. 2 is horizontally disposed. If array 210 is horizontally disposed, to thereby generate a vertically oriented "fan beam" which is scannable in azimuth, the null produced by horizontally disposed interferometer 230 produces a null at a particular azimuth for all elevation angles. This might be useful, for example, in the case of similar aircraft control radar systems operating at airfields which are situated close to each other. The similar radars might cause interference to each other during those times when one of their beams was directed toward the other. By placing the sidelobe null at the azimuth of the other radar, the amount of energy received therefrom, and the interference occasioned thereby, would be reduced.

Figure 4:
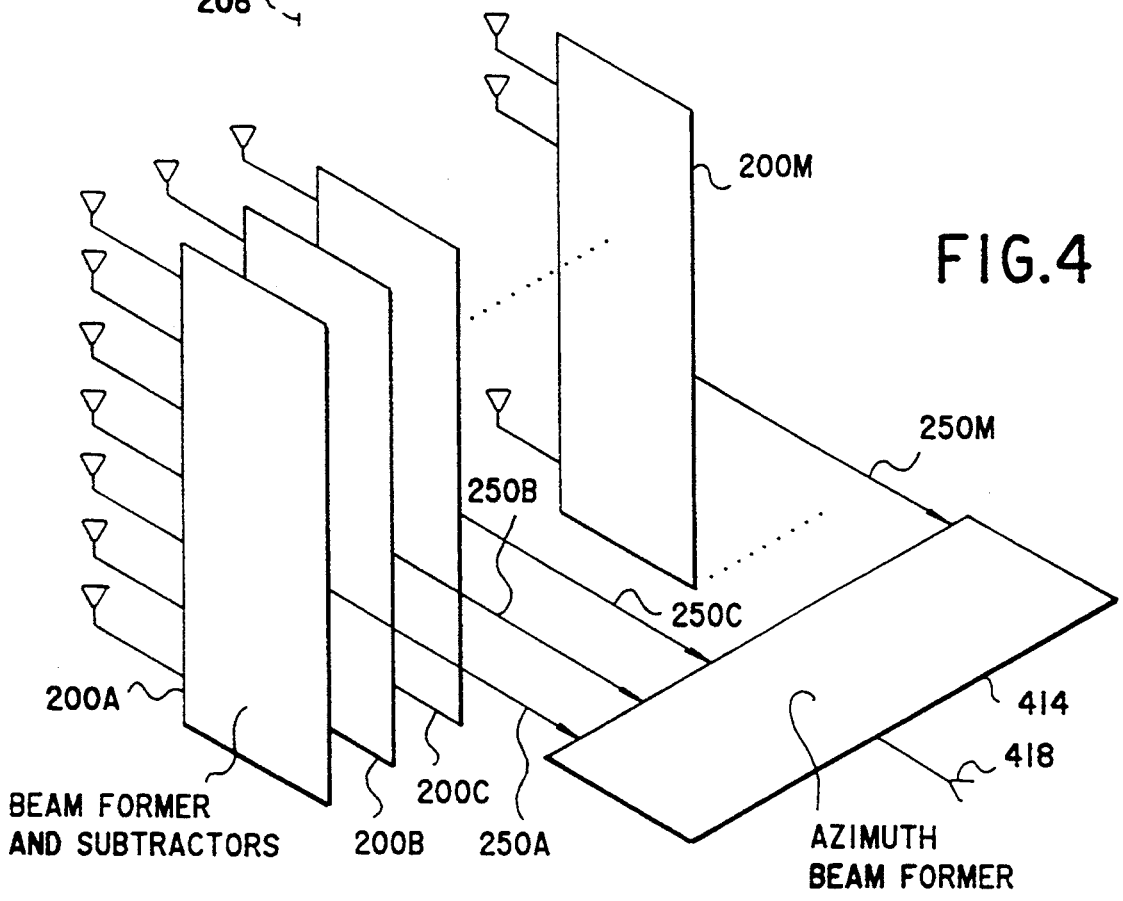
FIG. 4 is a simplified block diagram illustrating a plurality of the structures of FIG. 2 arranged and coupled to form a planar antenna array.

FIG. 4 illustrates a plurality M of blocks 200A, 200B, 200C . . . 200M, arrayed horizontally, where M may be any integer. Each structure 200 of FIG. 4 corresponds to the combination of antenna array 208, interferometer 230, and subtractor 240 of FIG. 2. Each structure 200 of FIG. 4 couples signals received by its corresponding antenna elements (212 a–n, 220 a & b) by way of a corresponding output port 250 (250A, 250B, 250C . . . 250M) to an azimuth beamformer illustrated as a block 414. Azimuth beamformer 414 combines the signals from structures 200 to form a beam which is directive in azimuth. Naturally, if structures 200 are horizontally disposed, beamformer 414 is an elevation beamformer. Beamformer 414 may include phase shifters, attenuators, combiners and amplifiers as known in the art. Beamformer 414 effectively combines the elevation beams, such as the beam described in conjunction with FIG. 3, and produces a combined beam which is directive in two dimensions. Such a beam may be generally termed a "pencil" beam, although its cross-section need not be circular. The pencil beam will have sidelobes in three dimensions, as known in the art. Assuming that the elevation beams and hulling of the several structures 200 are similarly adjusted to produce a null at a particular elevation angle by cancellation of at least a portion of a sidelobe of each of the several patterns, the net three-dimensional antenna pattern produced at combined output port 418 of FIG. 4 will have a null at that particular elevation angle, which null will extend in principle over all azimuth angles, or at least over most of the regions of interest. As mentioned, practical considerations may limit the region of interest, as for example to ±45°.

Figure 5B:
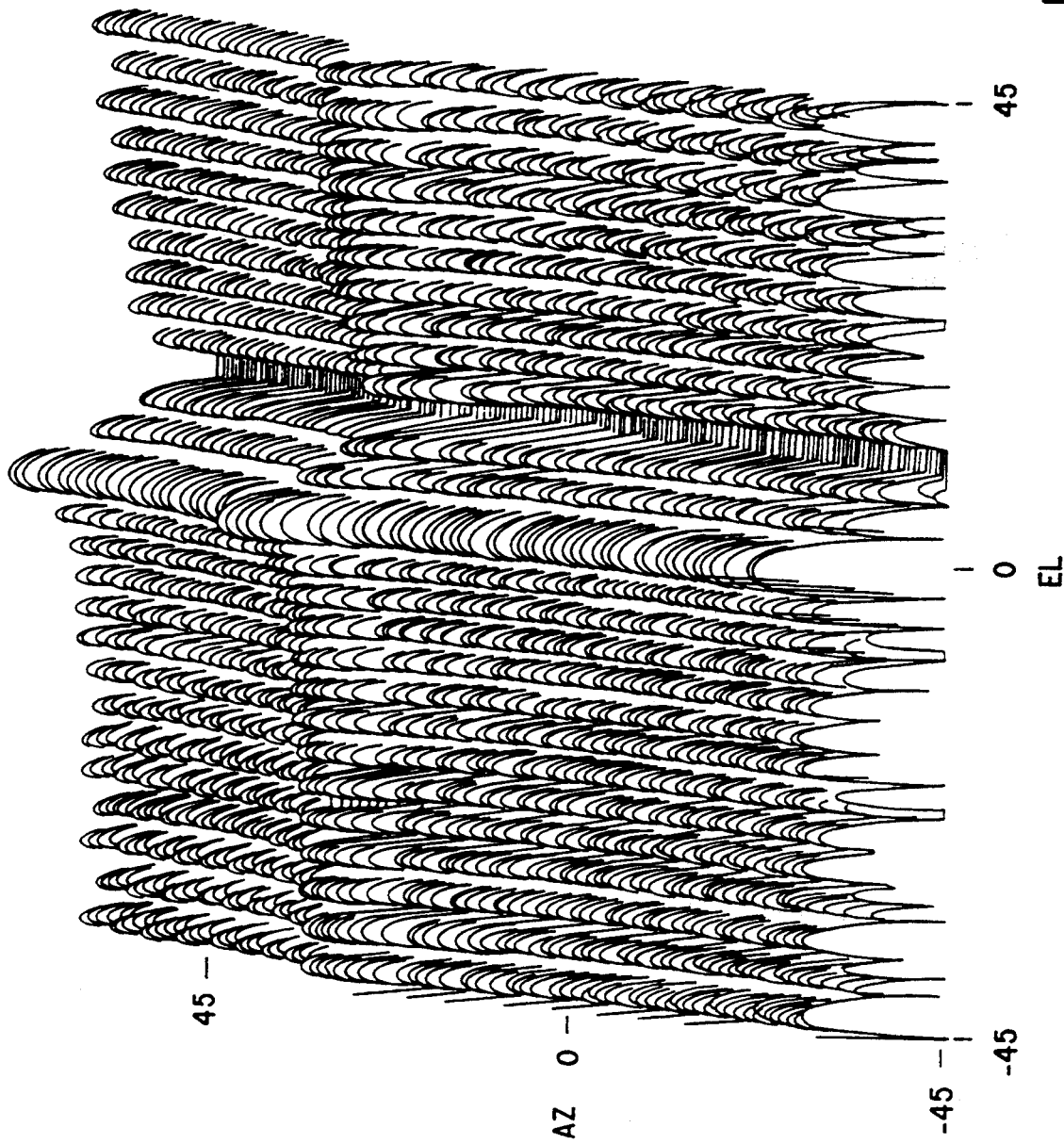
FIGS. 5b and 5c are similar plots with interferometer cancellation, illustrating nulls at about +10° and +28° in elevation.
Figure 5C:
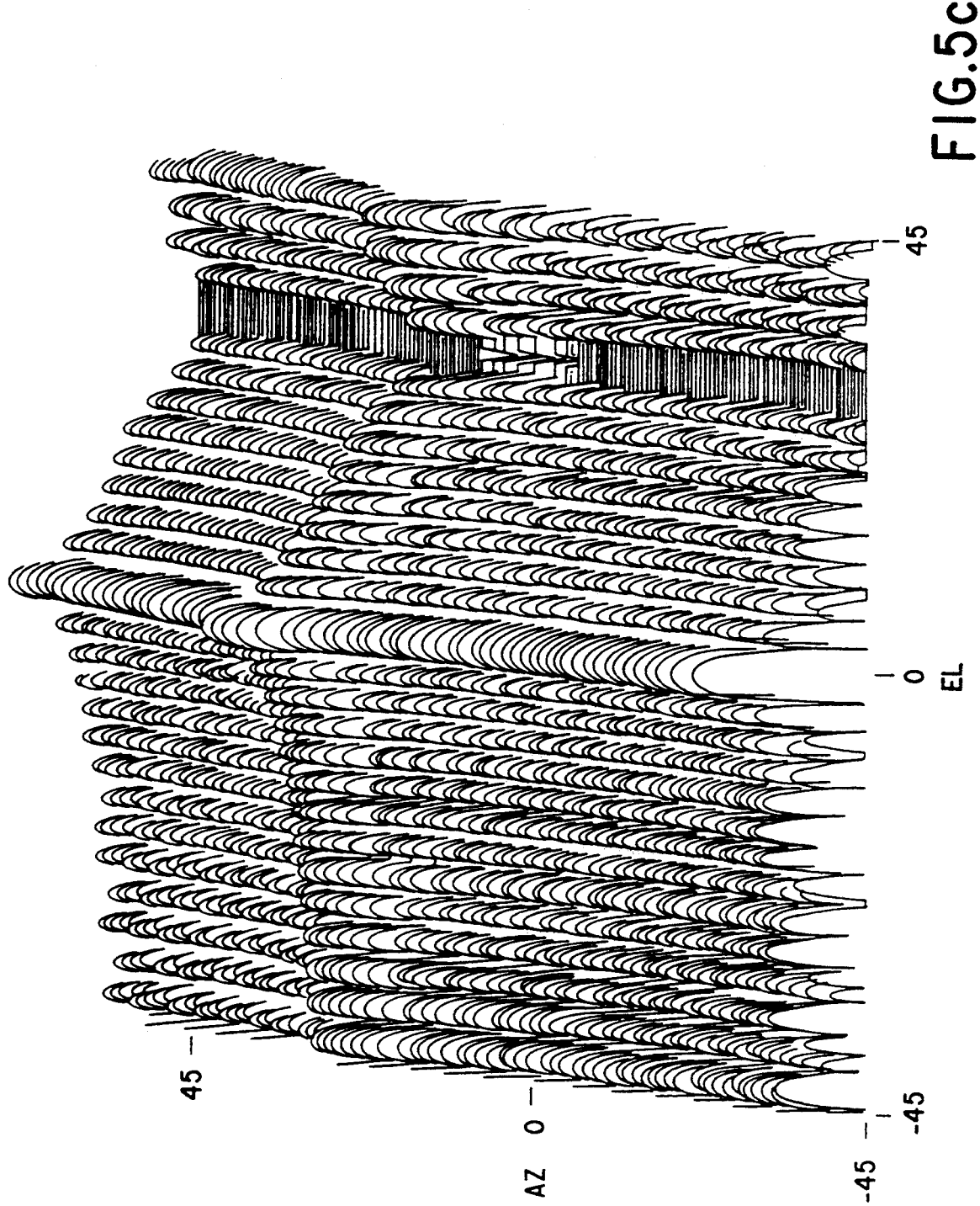

FIG. 5a illustrates, for reference and in perspective or isometric view, a computer-generated three-dimensional plot of a rectangular array similar to that illustrated in FIG. 4 with 40 rows and 40 columns, uniform weighting (no amplitude taper across the aperture), no amplitude or phase errors, with the main beam broadside to the plane of the antenna, and without hulling with an interferometer. The plot of FIG. 5a extends to ±45° in both azimuth and elevation. The amplitude scale is logarithmic. In FIG. 5a, the main beam, designated 510, has the greatest amplitude and is approximately 85 dB above the reference plane. The regular structure of the sidelobes is evident. FIG. 5b illustrates the same antenna pattern summed with an interferometer-generated lobe to create a null or notch at about +10° in elevation, and FIG. 5c illustrates the same antenna pattern with the null at about +28° in elevation. As illustrated in FIGS. 5b and 5c, the null extends over the entire azimuth, becoming somewhat wider in elevation because the amplitudes of the sidelobes decrease at azimuth angles far from the broadside position of the main beam.

Figure 6A:
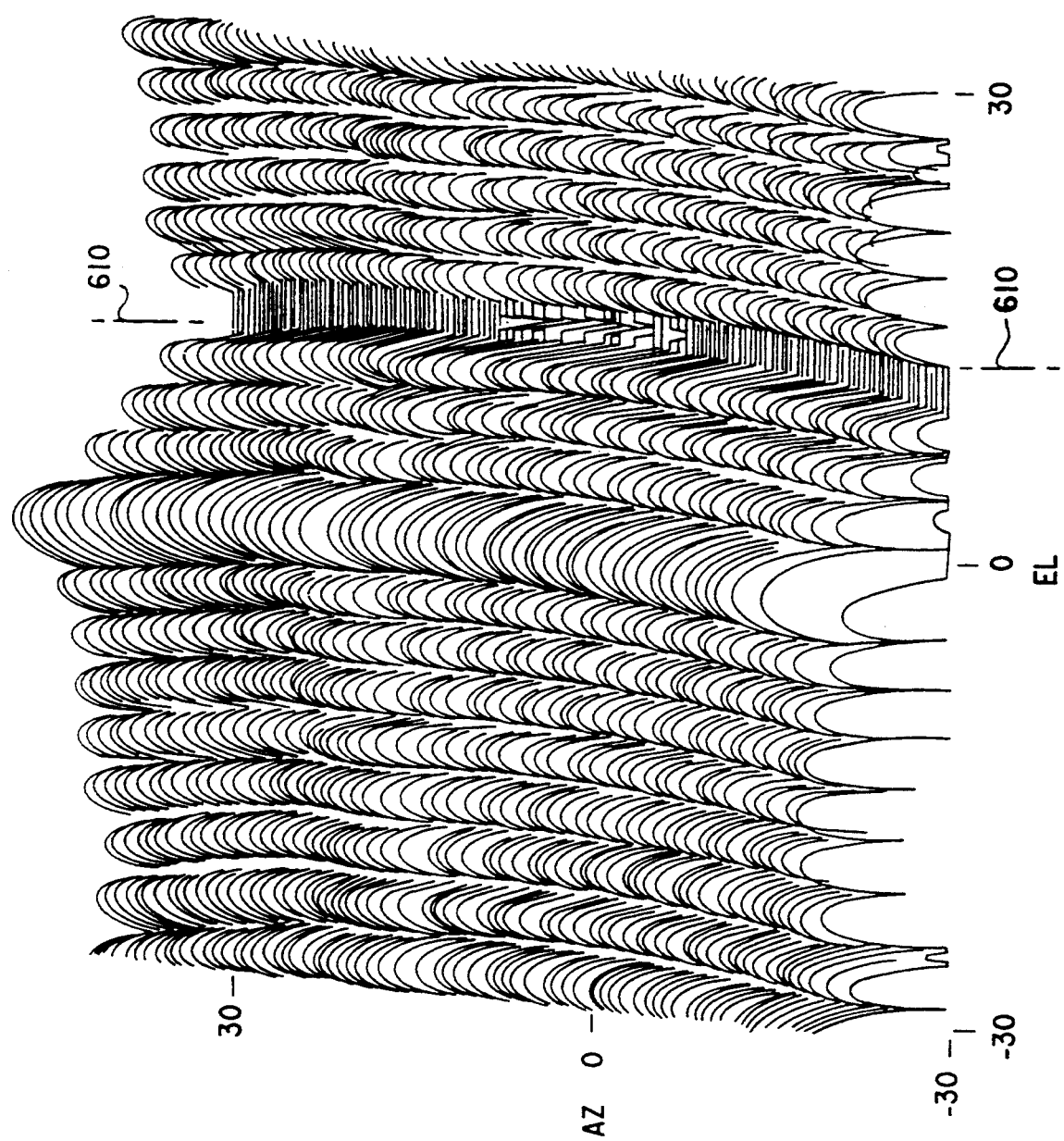
FIG. 6a illustrates in perspective or isometric view a computer-generated three-dimensional plot of the radiation pattern with nulls formed by a planar array such as that of FIG. 4 tilted 15° relative to the vertical.
Figure 6B:
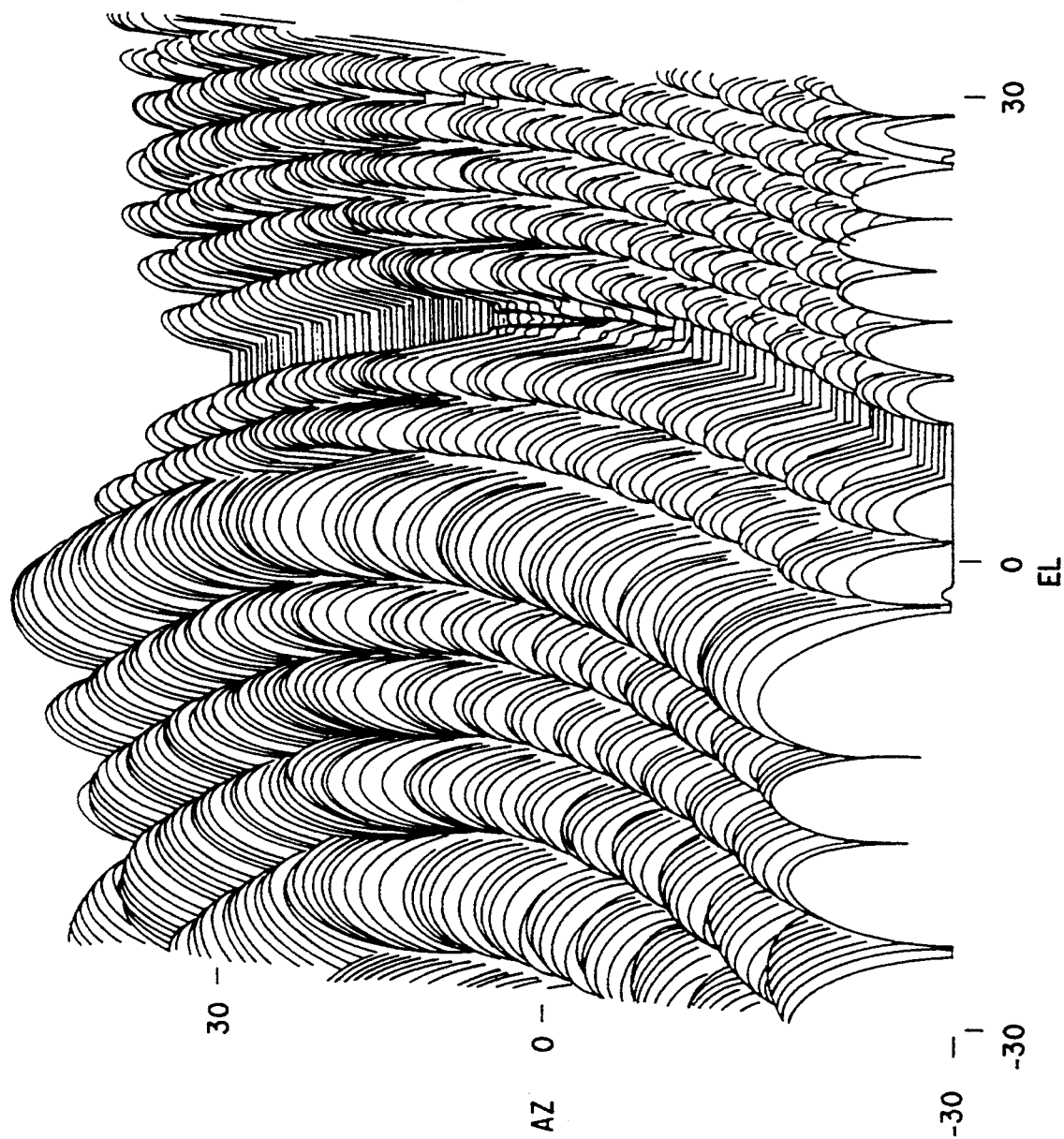
FIG. 6b illustrates a corresponding plot for a tilt of 45°.

FIGS. 6a and 6b illustrate radiation patterns of the structure of FIG. 4 under conditions similar to those for FIG. 5, with the array tilted relative to the vertical by 15° and 45°, respectively. The illustrated range is ±30° in both azimuth and elevation. The main beam is pointed at 0° azimuth and 0° elevation by scanning the beam to compensate for the tilt. At different azimuth angles, the phase shift between a distant source and the various antenna elements of the tilted array differs from element to element. The null, therefore, does not occur at the same elevation angle as a function of azimuth angle. In FIG. 6a, the bowing attributable to the 15° angle. The array tilt is evident, so the elevation position of the center of the null moves as a function of azimuth. The null is wide enough so that at about +10° elevation (corresponding to dash line 610), signals fall into the null at all azimuth angles. In FIG. 6b, the null is sufficiently curved so that no elevation angle is nulled for all azimuth angles. The illustrated null at 45° tilt of the planar array away from the vertical may not be useful, but illustrates the limiting degree of bowing available to match constant altitude jammer racetracks.

Figure 15A:
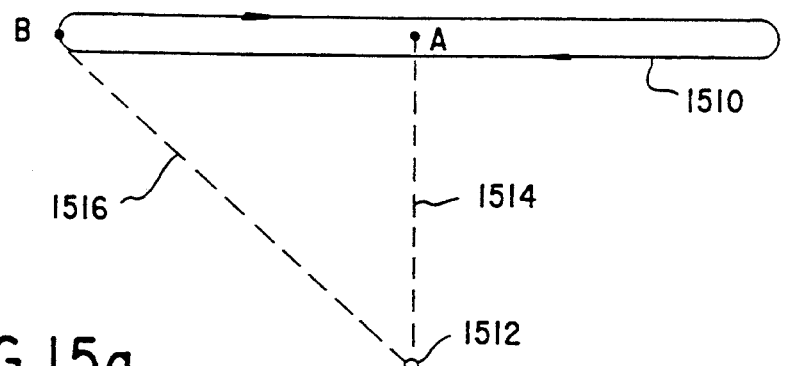
FIG. 15a is a plan view of a racetrack at a distance from a radar site.
Figure 15B:
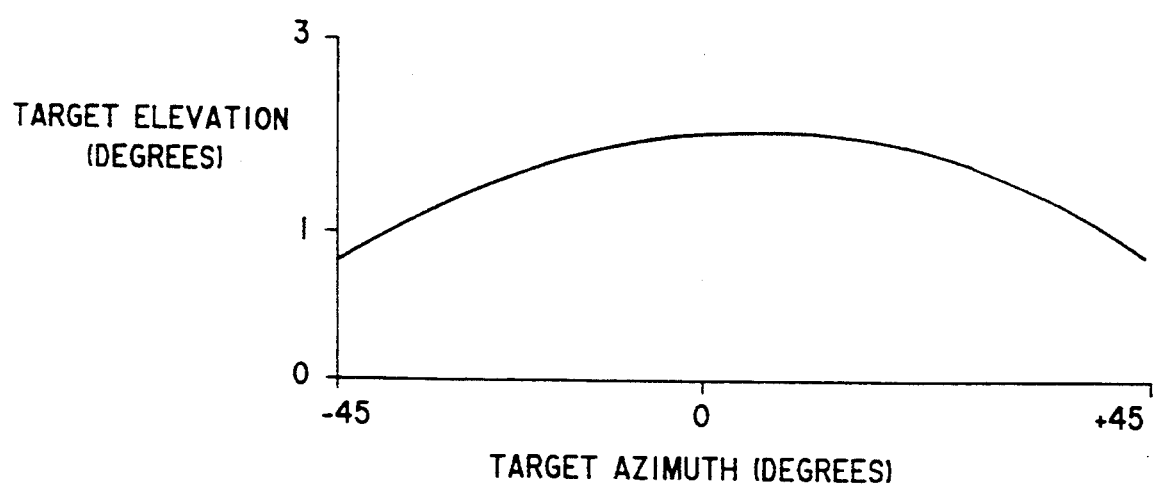
FIG. 15b is a plot of target (jammer) elevation angle as seen from the radar site of FIG. 15a versus azimuth angle when the target altitude is constant.

The bowing of the null as illustrated in FIGS. 6a and 6b can be advantageous. FIG. 15a is a plan view of a racetrack path 1510 taken by jammers. The racetrack as illustrated in nominally 100 km from a radar site 1512 along a path illustrated as a dash-line 1514. If the jammer aircraft flying the racetrack course are at an elevation of 35,000 feet, an aircraft at location A near the center of the racetrack will be at an apparent elevation angle of 2.7° as seen from radar site 1512, while another aircraft at point B, 140 km from radar site 1512 along dash-line path 1516, will be at an apparent elevation angle of only 1.4°. Thus, the apparent elevation angle of the racetrack changes with azimuth. Tilting of the antenna array in a selected amount can bow the null to correspond to the elevation angle of the jammers. This is illustrated in FIG. 15b, which represents the elevation in degrees of a target at a constant altitude of 10 km as seen from a site 200 km from a normal to the target track. Tilt in the direction illustrated in FIGS. 6a and 6b may be suitable for a ground station, while tilt in the opposite direction (not illustrated) may be suitable for an airborne radar system flying at an altitude above that of the jamming aircraft.

Figure 7A:
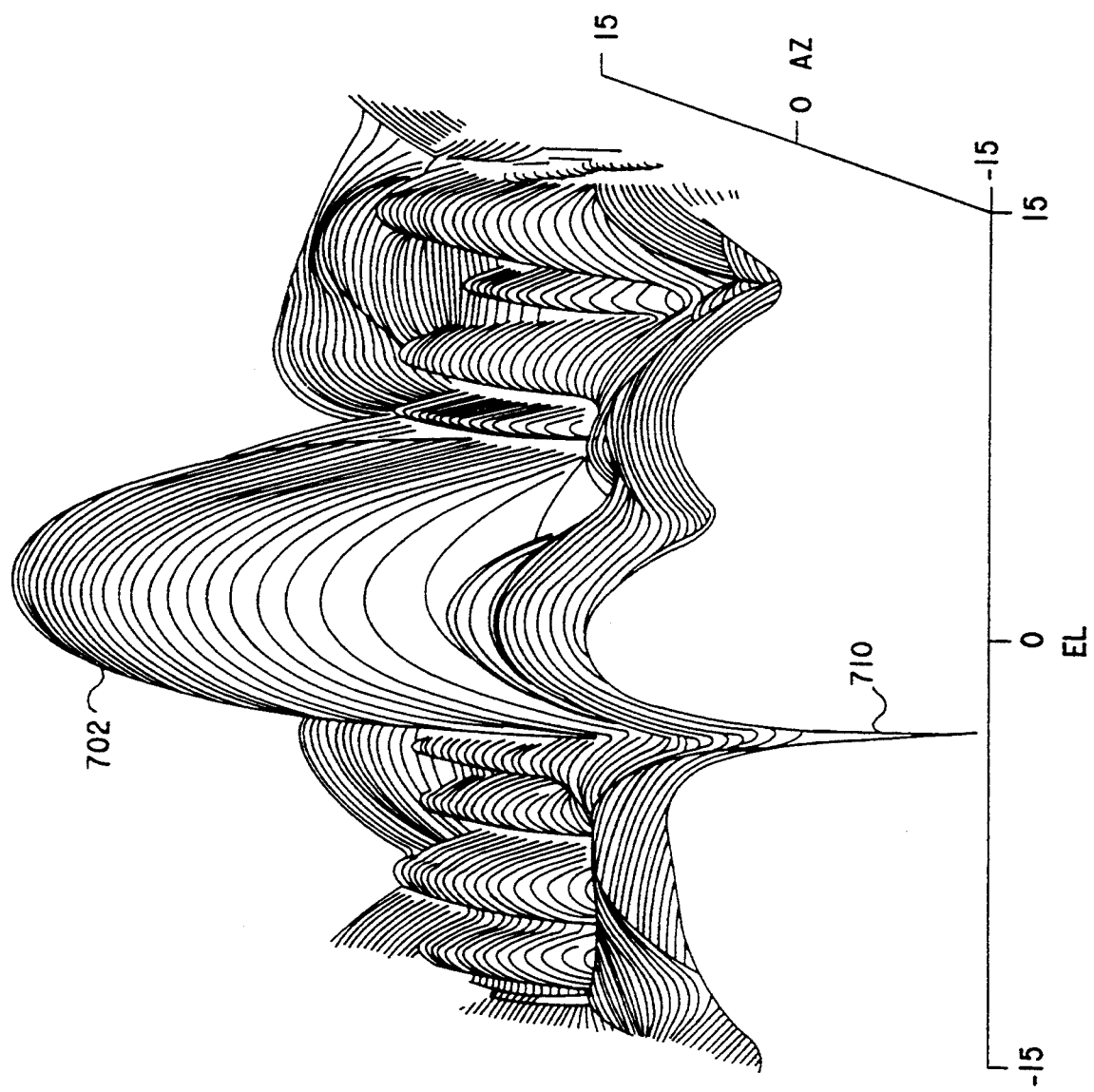
FIG. 7a illustrates in perspective or isometric view a computer-generated 3-dimensional plot of the uncanceled radiation pattern formed by the structure of FIG. 4 with Taylor weighting, 2% RuMS amplitude error and 2° phase error Gaussian distributed among the elements and columns when interferometer cancellation is not used.
Figure 7B:
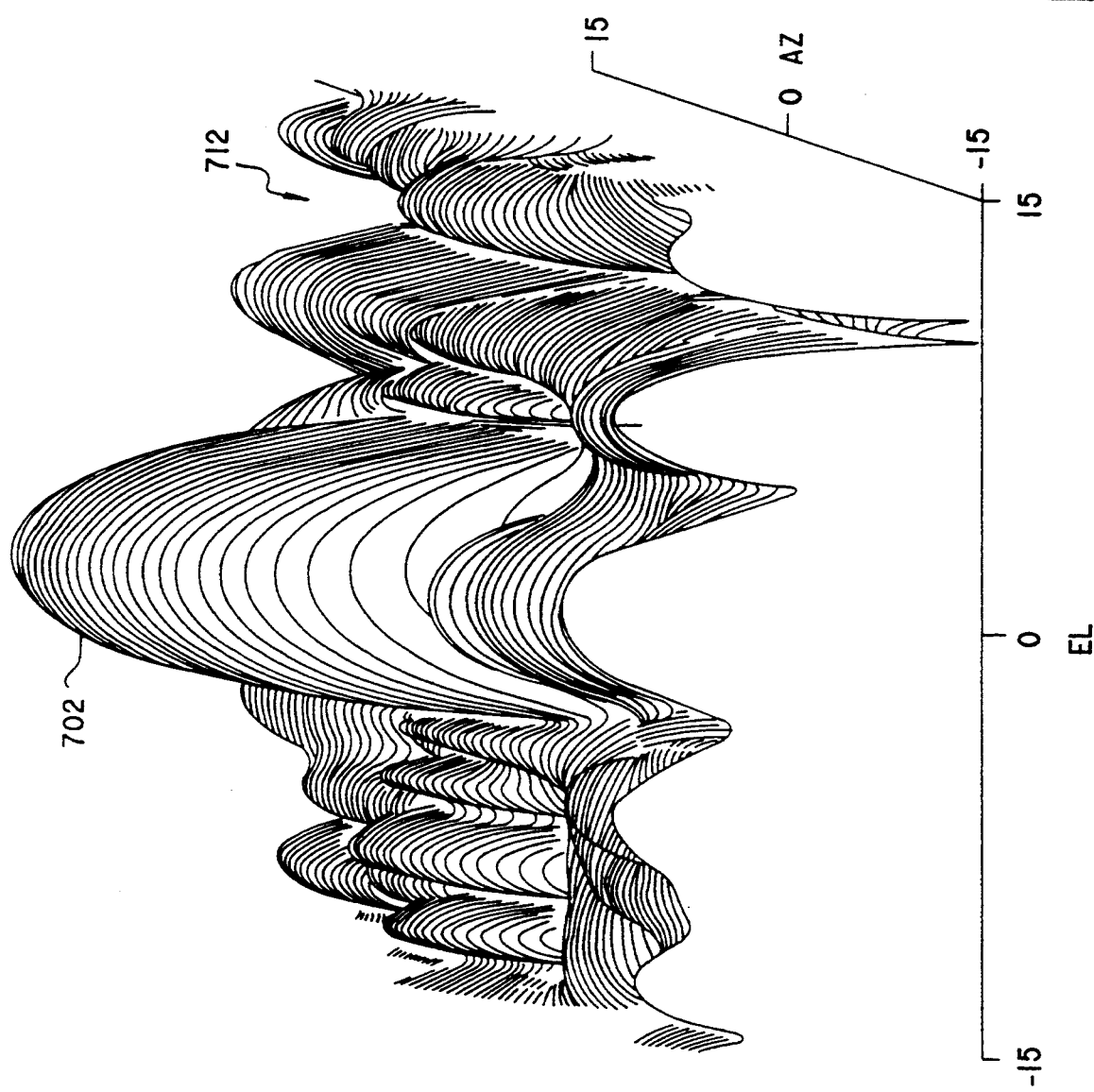
FIG. 7b is a corresponding pattern with an interferometer canceler notch near 10° elevation.
Figure 7C:
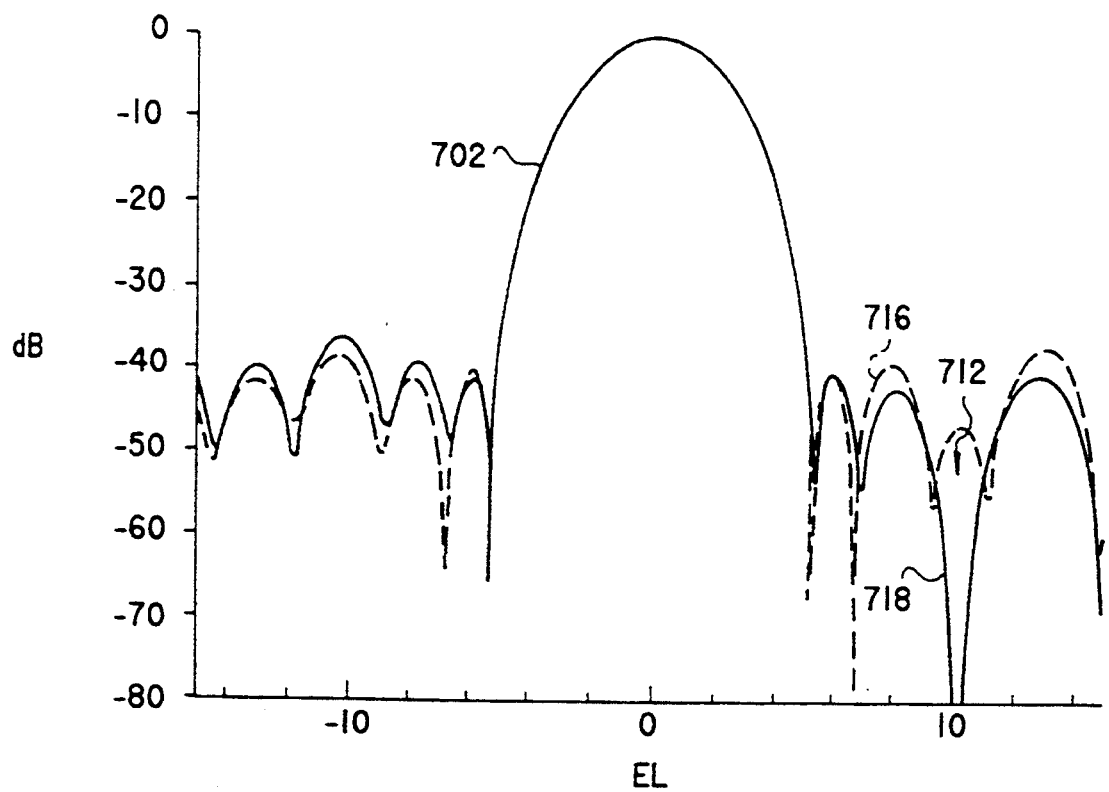
FIG. 7c is a 2-dimensional elevation plot at 0° azimuth angle corresponding to cuts through FIGS. 7a and 7b.
Figure 7D:
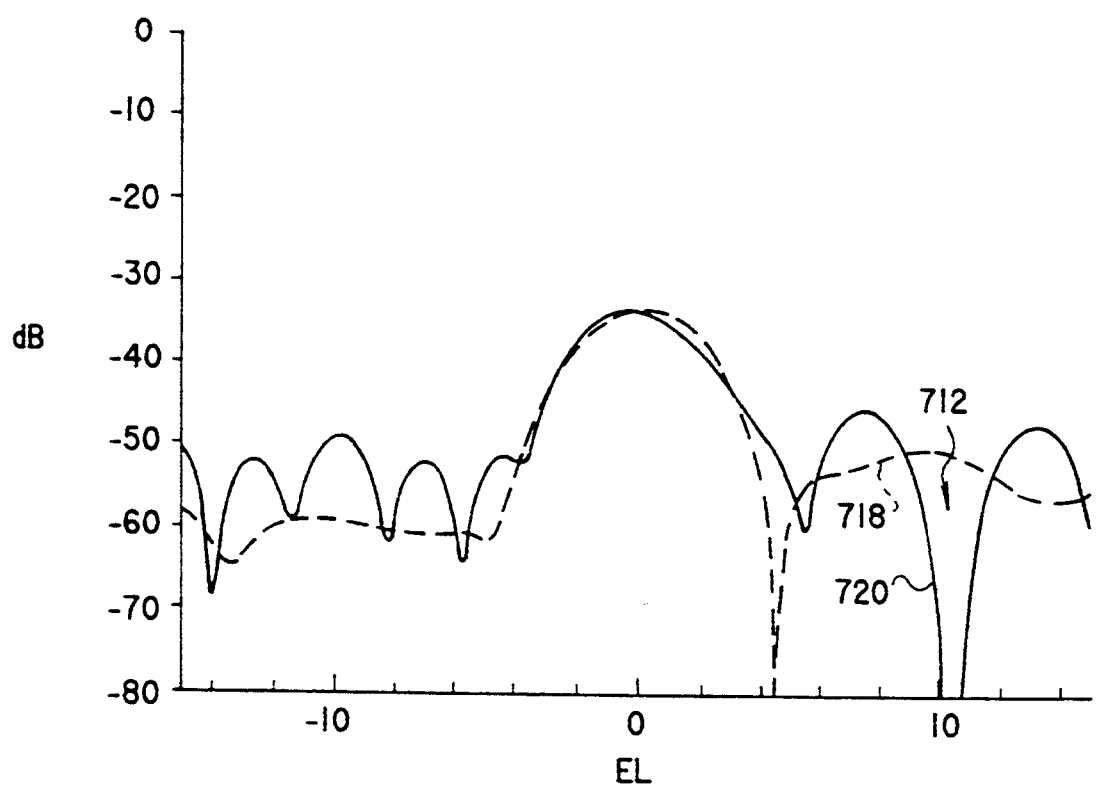
FIG. 7d is another 2-D elevation cut at 8° azimuth angle.
Figure 7E:
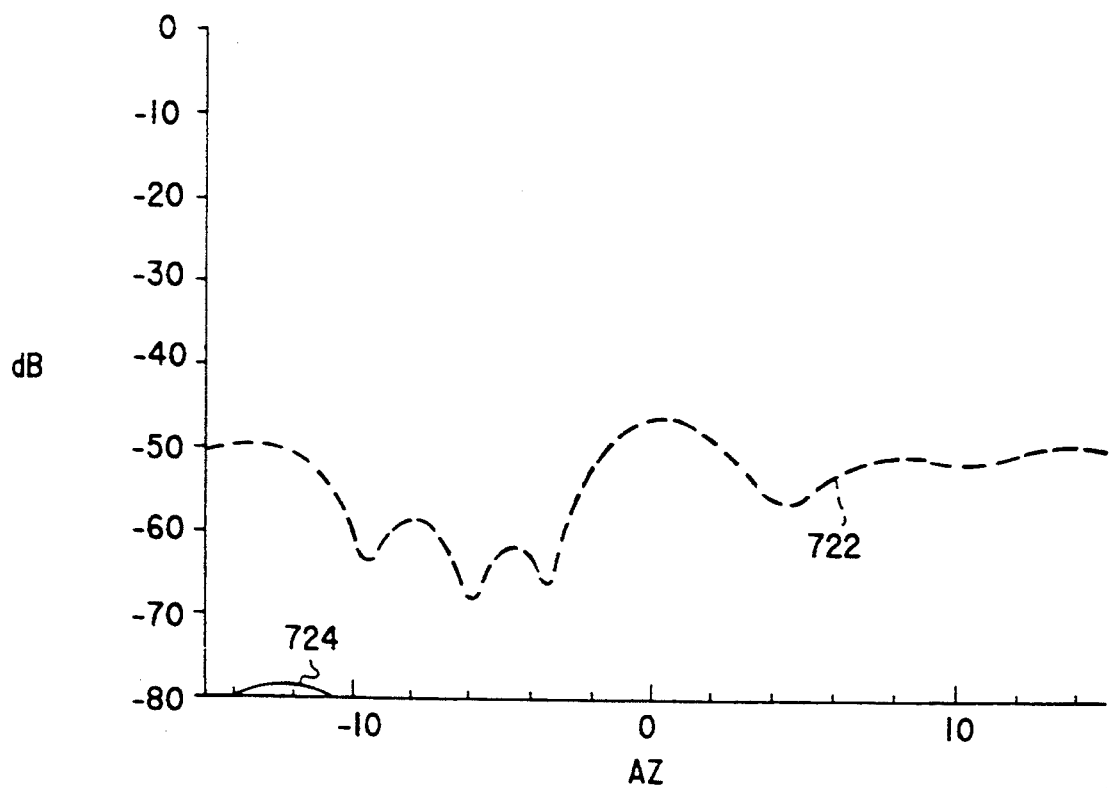
FIG. 7e is a 2-D azimuth cut at 10.25° elevation angle.
Figure 7F:
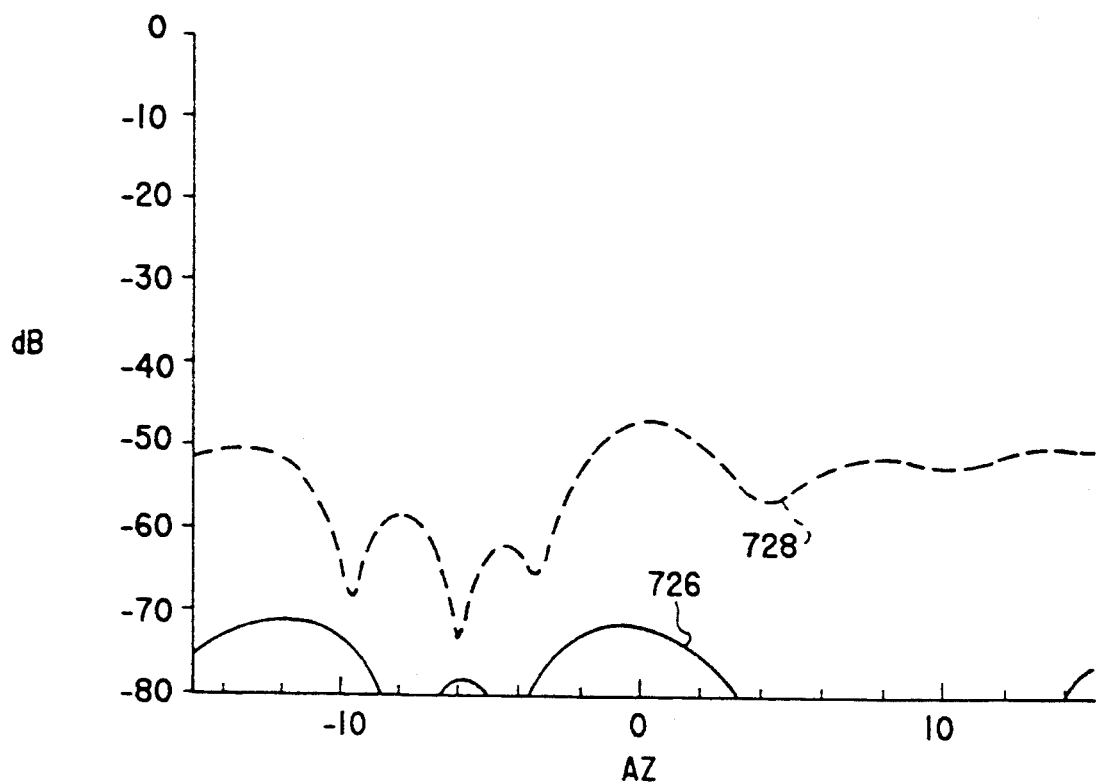

The array antenna radiation patterns illustrated in FIGS. 5 and 6 are idealized patterns which ignore the effects of amplitude and phase errors. FIGS. 7a and 7b illustrate three-dimensional antenna patterns without and with interferometer cancellation, respectively. Both patterns are calculated with Taylor weighting, and with Gaussian-distributed column-to-column and element-to-element 2° RMS phase errors and 2% RMS amplitude errors. The Taylor weighting is selected for a −40 dB sidelobe level. In FIGS. 7a and 7b, the main beam 702 is pointed broadside to the array. The uncancelled pattern of FIG. 7a exhibits a single point null 710 as a result of the amplitude and phase errors. The azimuth extent of a null 712 created by the interferometer is at least ±15° in azimuth, as illustrated in FIG. 7b. The effect of a general increase in the sidelobe level on the side of pattern away from the null has eliminated point null 710 in FIG. 7b. FIG. 7c illustrates two-dimensional (2D) elevation antenna patterns (also known as "cuts") taken at an azimuth angle of 0° through the three-dimensional patterns of FIGS. 7a and 7b. In FIG. 7c, dash line 716 corresponds to the uncancelled pattern of FIG. 7a, and solid line 718 corresponds to the hulled pattern of FIG. 7b. FIG. 7d is a corresponding 2D elevation pattern taken at an azimuth angle of 8°, with dash line 720 being the un-nulled pattern, and solid line 720 the nulled pattern. The quality of null 712 may be appreciated by reference to FIG. 7e, which is an azimuth pattern at an elevation of 10.25°, corresponding to the response in the null as a function of azimuth angle. In FIG. 7e, the uncancelled response is illustrated by dash line 722, and the canceled response by solid line 724, which is mostly beneath the floor of the plot, but appears to be about 30 dB (or possibly more) below the uncancelled response over ±15° in azimuth. The null does not appear to be quite as deep at an elevation angle of 10.5°, as illustrated by the azimuth pattern of FIG. 7f. In FIG. 7f, the canceled response is illustrated by solid line 726, and the uncancelled response by dash line 728.

Figure 8A:
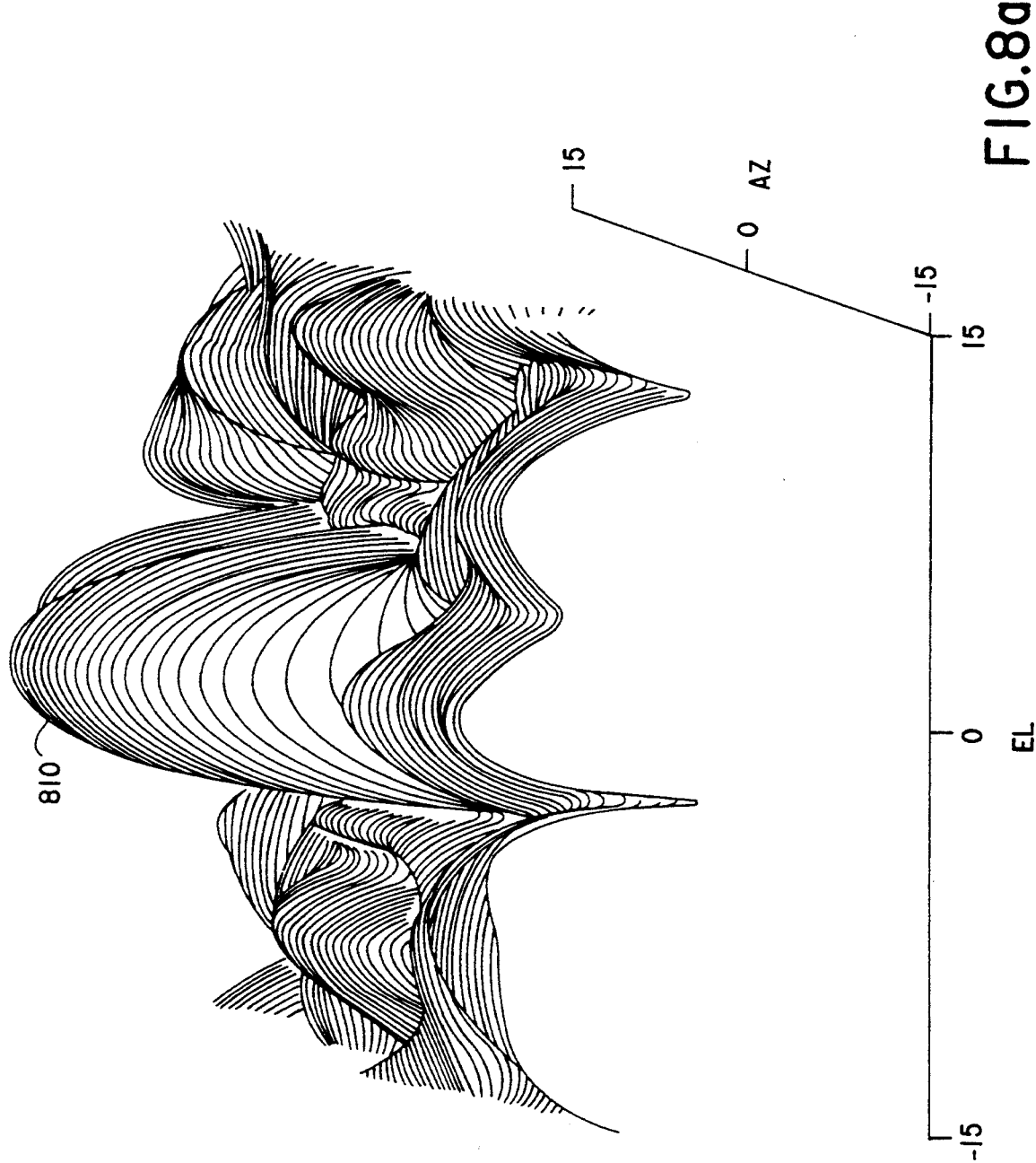
FIG. 8a illustrates in perspective or isometric view a computer-generated three-dimensional plot of an uncanceled radiation pattern produced by a structure similar to that of FIG. 3, with Taylor weighting, 8% RMS amplitude errors and 8° phase errors Gaussian distributed among the elements and columns.
Figure 8C:
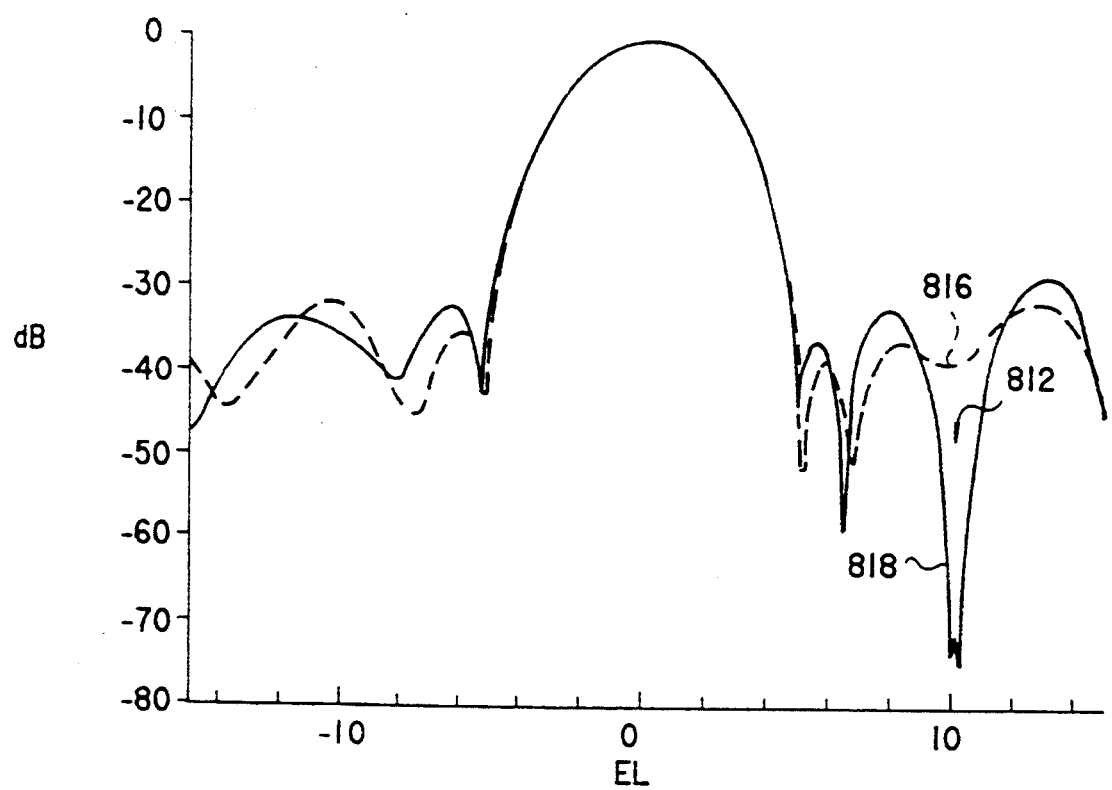
FIG. 8c is a 2-D elevation plot at 0° azimuth for both nulled and un-nulled conditions.
Figure 8D:
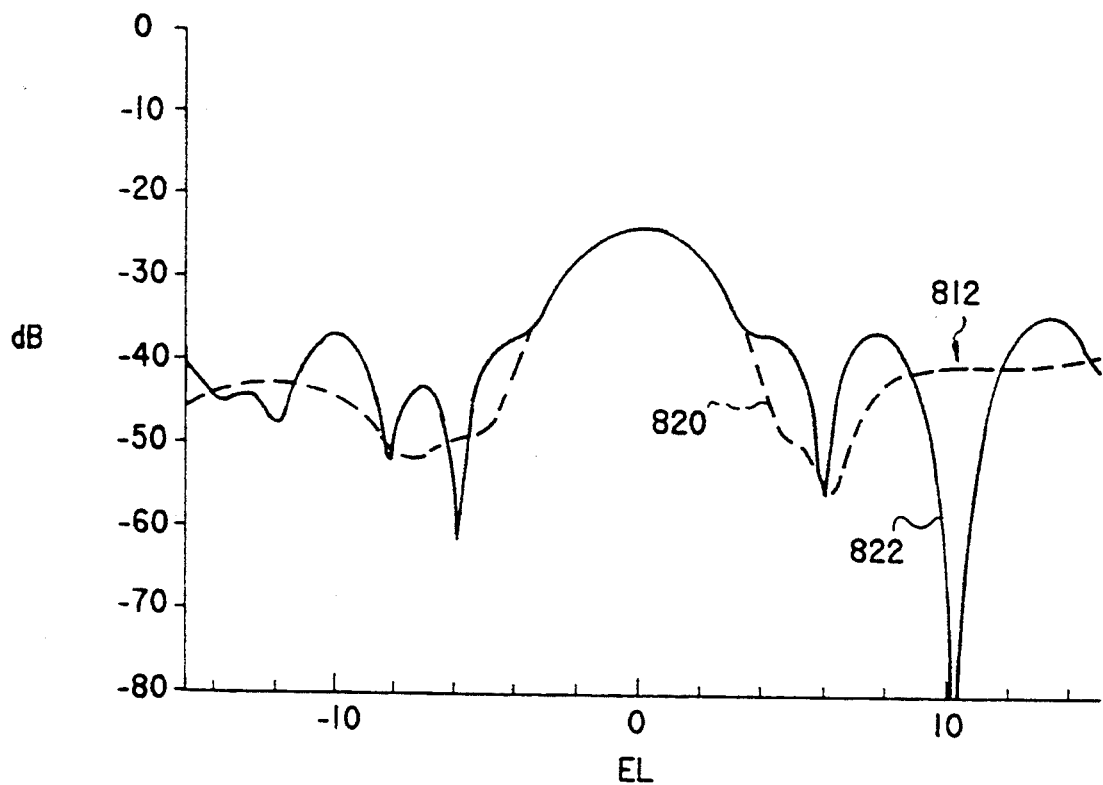
FIG. 8d is a similar 2-D elevation plot at 8° azimuth angle.
Figure 8E:
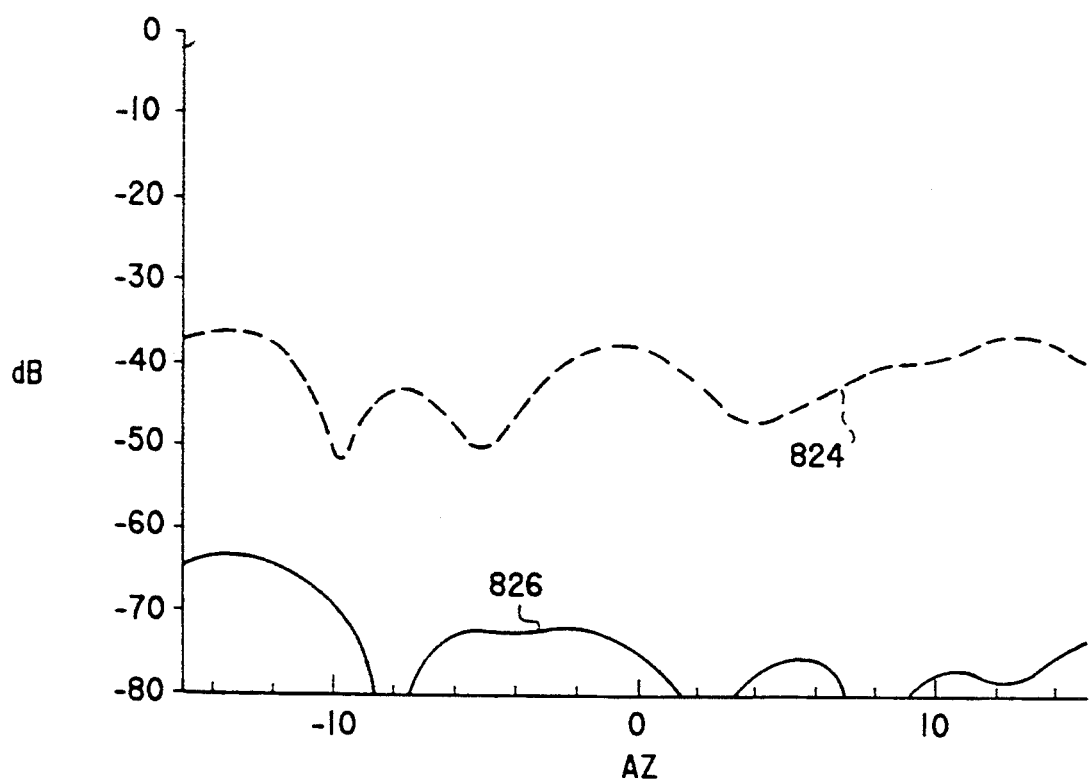
FIG. 8e is a 2-D azimuth plot at an elevation angle of 10.25°.

FIG. 8a illustrates an uncancelled 3D array antenna pattern with Taylor weighting, and with Gaussian distributed 8° RMS phase and 8% RMS amplitude errors. These errors represent maximum acceptable levels from practical performance considerations and result in peak sidelobes less than 20 dB down from main lobe. FIG. 8b illustrates the corresponding antenna pattern with a null 812 at about +10° elevation. FIG. 8c is a 2D elevation pattern under these same conditions at 0° azimuth angle for uncancelled (dash line 816) and canceled (solid line 818) conditions. FIG. 8d is a corresponding elevation pattern taken at an 8° azimuth angle; dash line 820 is the uncancelled pattern and 820 is the pattern exhibiting null 812 at an elevation angle slightly greater than 10°. FIG. 8e is an azimuth pattern at 10.25° elevation angle, through the null. As illustrated by the difference between the uncancelled response and canceled response 826, the null for this large error case is about 25 to 30 dB deep. In general, when errors are present, the interferometer canceler can still be used to cancel the basic error-free sidelobes, leaving residual error sidelobes in the resulting null.

Conceptually, it is easy to understand that when a plurality of substantially individual column arrays have substantially identical elevation patterns with a null over a particular range of elevation angles, the combined antenna pattern will also have a null at those same angles. Most planar arrays are of some shape other than rectangular, as for example circular, elliptical, rectangular with corners missing, or the like. In such an irregularly shaped array, the column lengths are not identical. Therefore, the elevation locations of the peaks of the sidelobes of the individual columns may vary, and a notch placed on the peak of a sidelobe of one column will not necessarily be at the same elevation angle as the peak of a sidelobe of an adjacent column. However, the interferometer canceler is not just limited to operation on peak sidelobes. In the vicinity of a main antenna sidelobe, the error-free 2D pattern can be approximated locally as a portion of a "sine wave". The interferometer response can also be approximated as a portion of a "sine wave" and can be adjusted to match that of the main pattern sidelobe. For each line array in the main antenna of differing length, an interferometer canceler can be used to obtain the null at the desired elevation. In general, few of the line arrays will have nulls centered upon peak side lobes of adjacent line arrays. The effectiveness for each line array will depend upon the number of elements and weight factors used. There are some ameliorating factors in irregularly shaped arrays. The columns near the extremes of the irregular array are inherently of low weight because of the limited number of antenna elements which they contain, so their effects tend to be small. In many such arrays, there are a large number of columns of the same size (equal numbers of antenna elements). Furthermore, nulls in all columns which are set near the same elevation angle will overlap. Some steps can be taken to further ameliorate the situation, as by matching interference lobes in each column with the sides of sidelobes to create nulls at the same elevation angles. This is essentially the same type of cancellation as that already described, except that it is performed on the sides of sidelobes rather than at the peaks.

Figure 9:
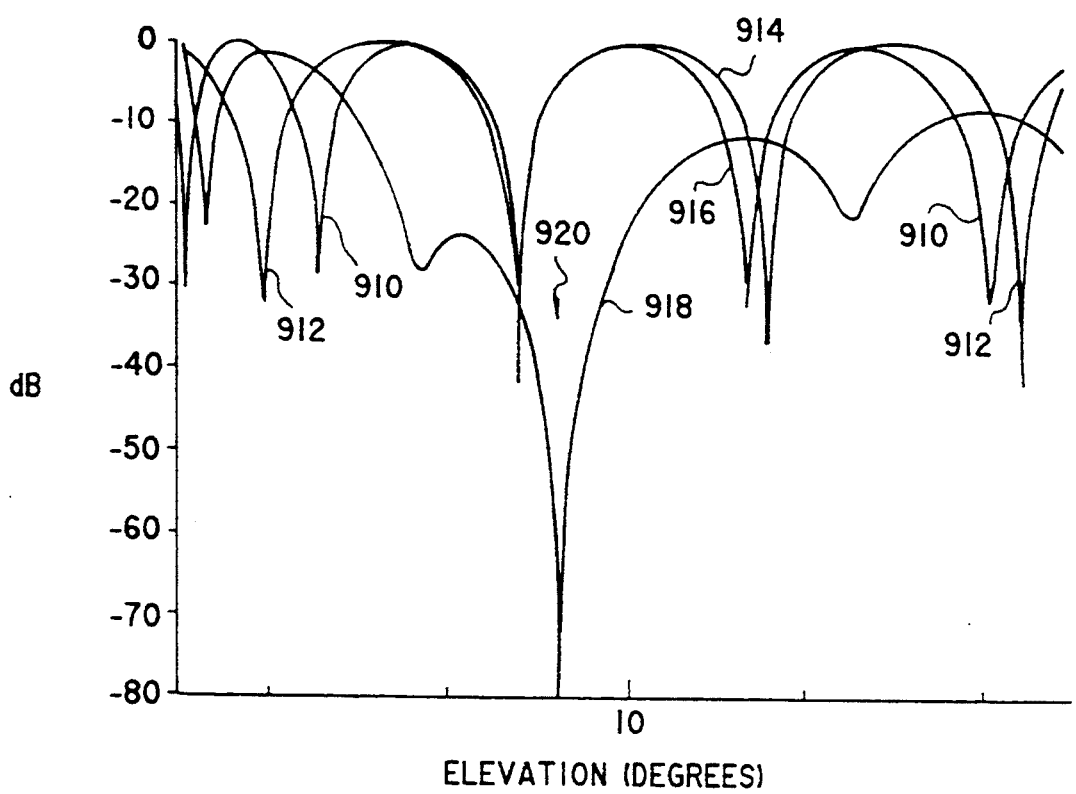
FIG. 9 is a computer-generated plot illustrating antenna sidelobes and interference lobes which do not have the same spatial frequency or angular width, with the position and amplitude relatively adjusted to match the slopes on one side, for generating a null pattern.
Figure 16A:
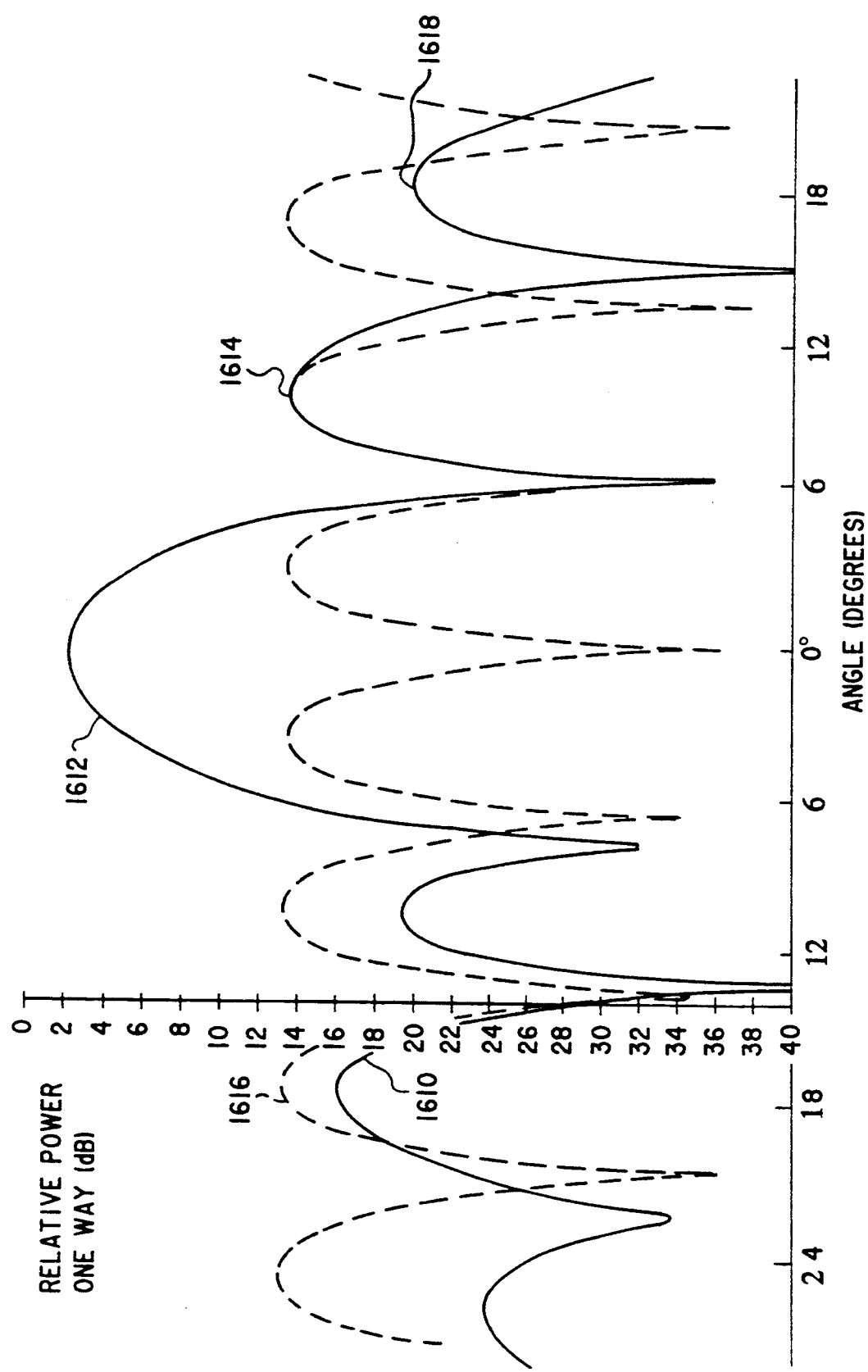
FIG. 16a illustrates a radiation pattern of a column array of 16 elements and of an associated two-element interferometer similar to FIG. 2.
Figure 16B:
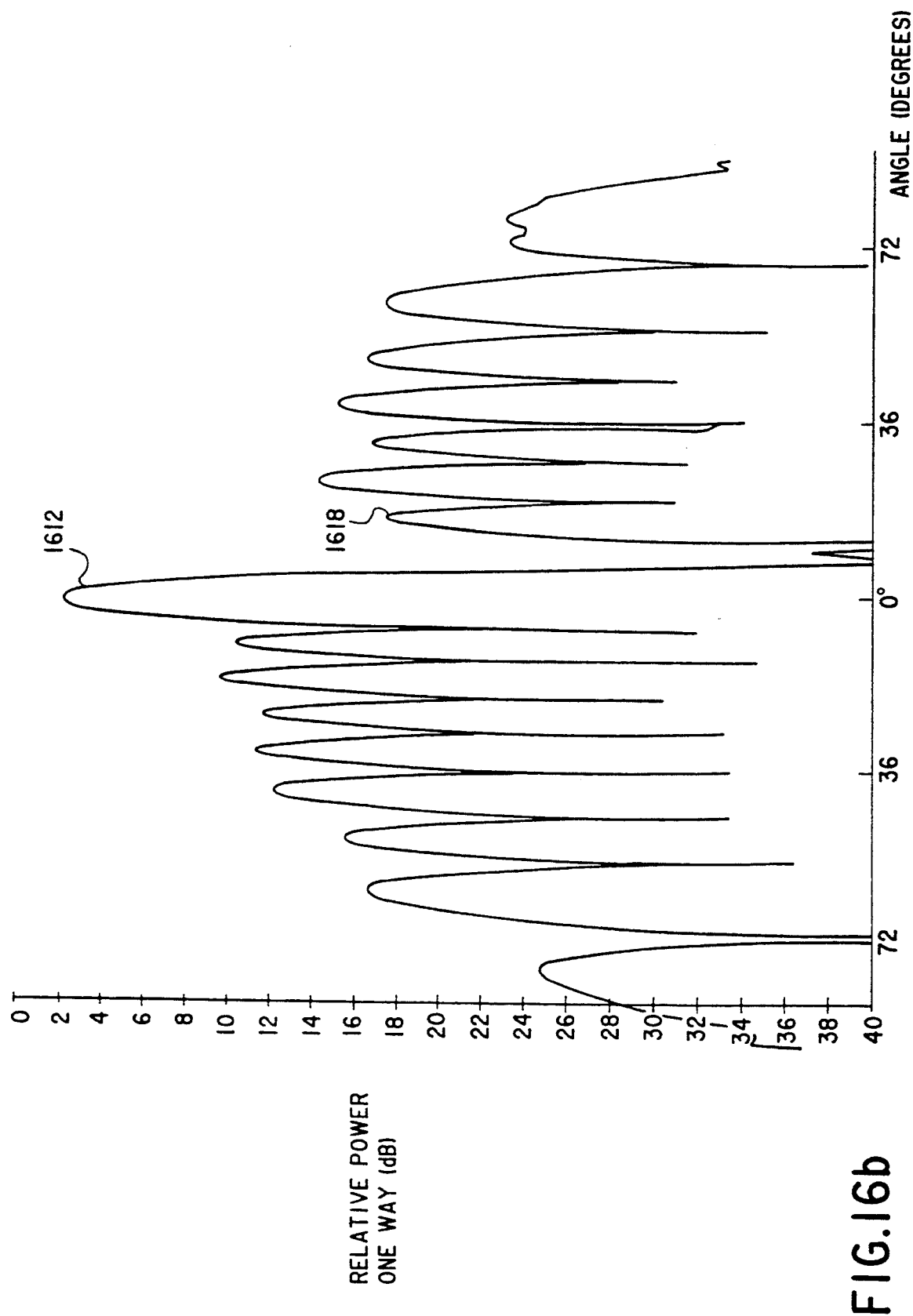
FIG. 16b is a plot of the combination of FIG. 16a showing the resulting cancellation of the first sidelobe.
Figure 16C:
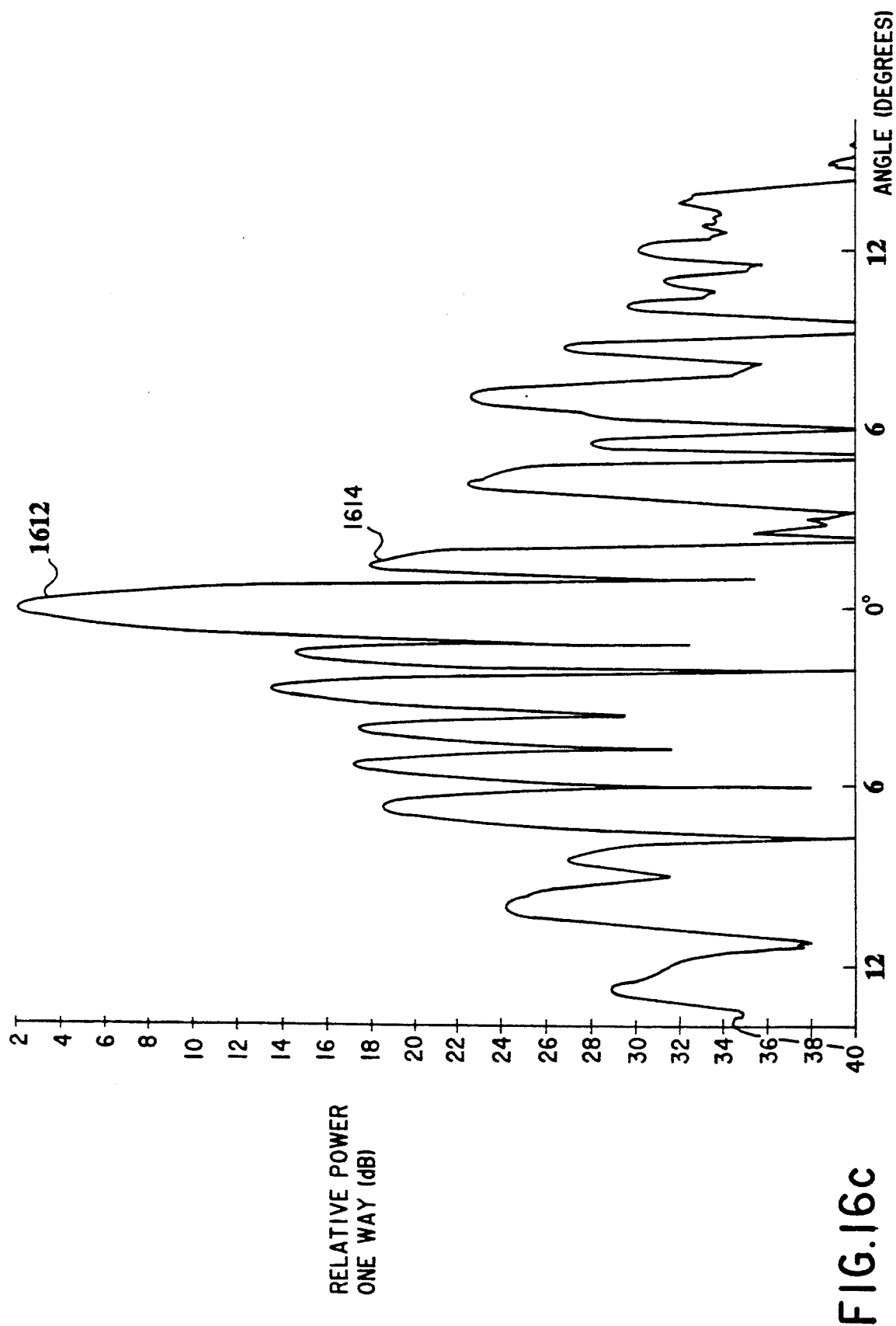
FIG. 16c is a corresponding plot showing cancellation of the second sidelobe.

FIG. 9 illustrates a portion 910 of an original array antenna pattern, together with an interference pattern 912 in which an interference lobe 914 does not exactly match the spatial frequency (width) or shape of original sidelobe 916. By shifting interference lobe 914 to the right as illustrated (to a higher elevation angle), the slopes of the left side of sidelobe 916 is substantially matched by interference lobe 914, and results in a cancellation pattern 918 defining a null 920 with a width of about $\frac{1}{2}°$ at $-30$ dB. Thus, the inventive arrangement operates even with main pattern sidelobes which are not of uniform width, and with the interferometer sidelobes of only one width. FIG. 16a illustrates as a solid line 1610 a two-dimensional radiation pattern of an experimental 16-element column array with a main lobe 1612, a first sidelobe 1614 and a second sidelobe 1618, and also illustrates as a dash line 161 a further two-element interferometer pattern adjusted in phase and amplitude for cancellation of sidelobe 1614. The plot of FIG. 16b illustrates the resulting cancellation, and FIG. 16c illustrates the result of readjustment for cancellation of second sidelobe 1618.

Figure 10:
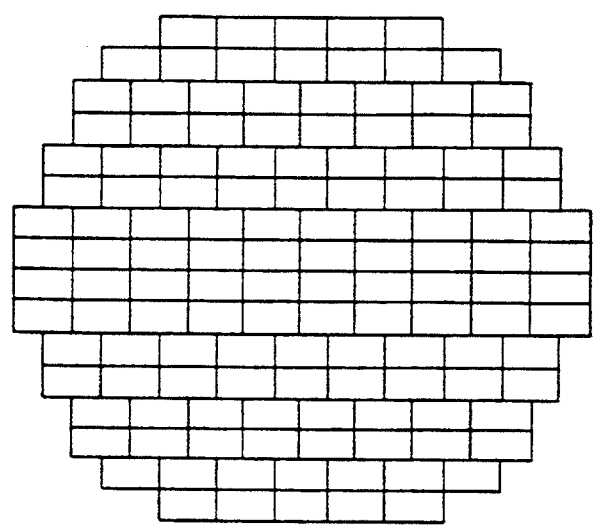
FIG. 10 is a simplified frontal view of the elements of a prior-art nonrectangular planar array in which vertical line arrays of differing lengths are used to approximate a circular aperture.
Figure 11A:
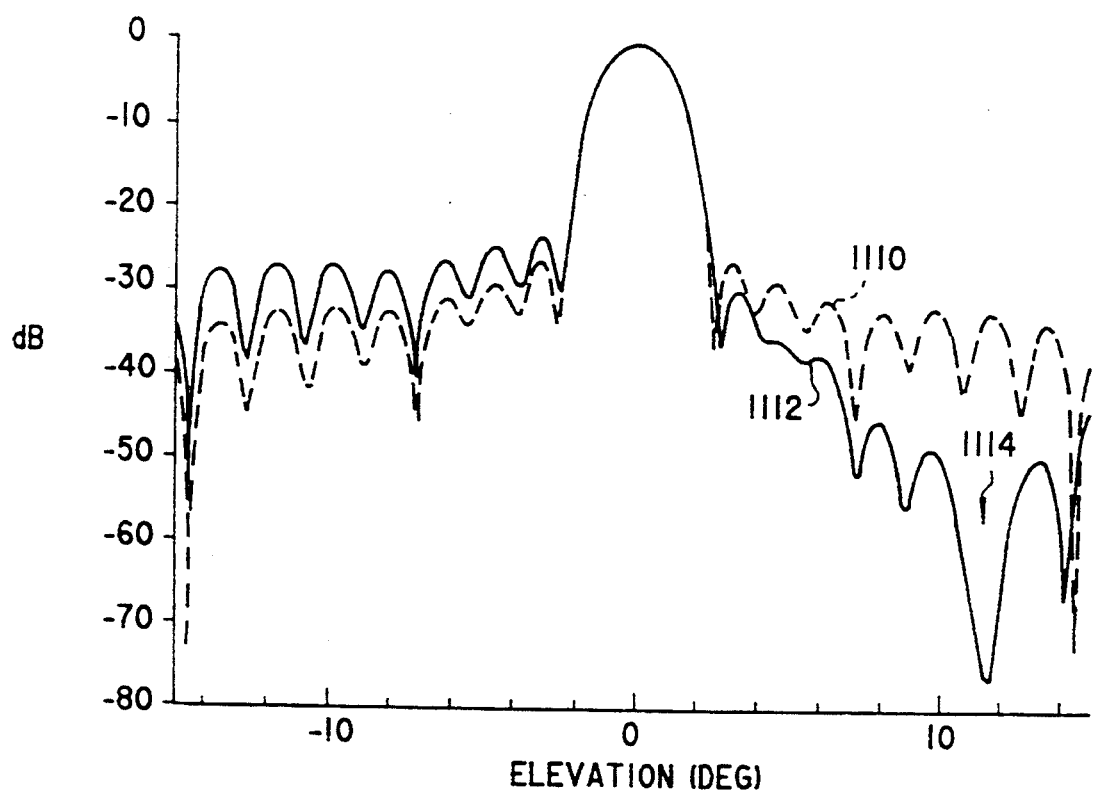
FIG. 11a is a computer-generated two-dimensional plot of elevation antenna patterns of the array of FIG. 10, at 0° azimuth angle, without amplitude or phase errors, in both an un-nulled condition and in a condition of peak-nulling using interferometer cancelers on each line array.
Figure 11B:
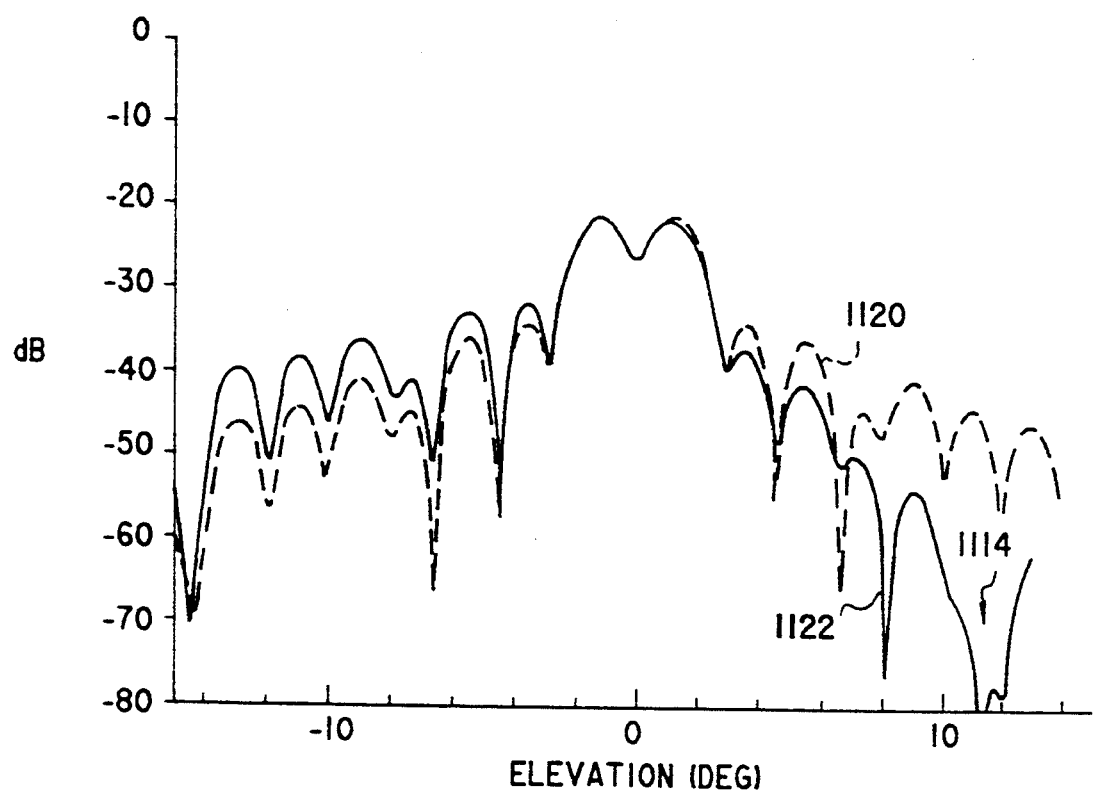
FIG. 11b is a corresponding elevation plot at an azimuth angle of 8°, FIGS. 11c, d and e are corresponding azimuth plots through the null elevation angles of 12.125°, 12.25° and 12.5°, respectively.
Figure 11C:
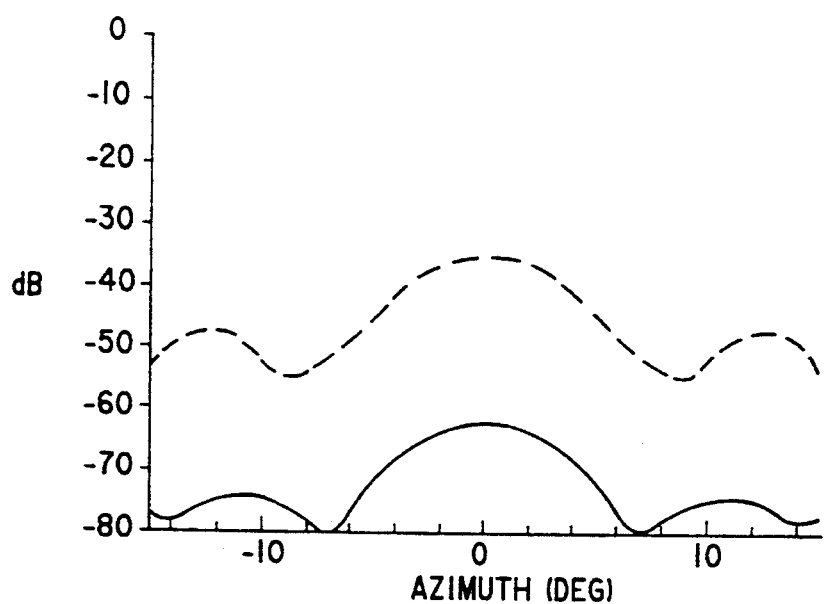
Figure 11D:
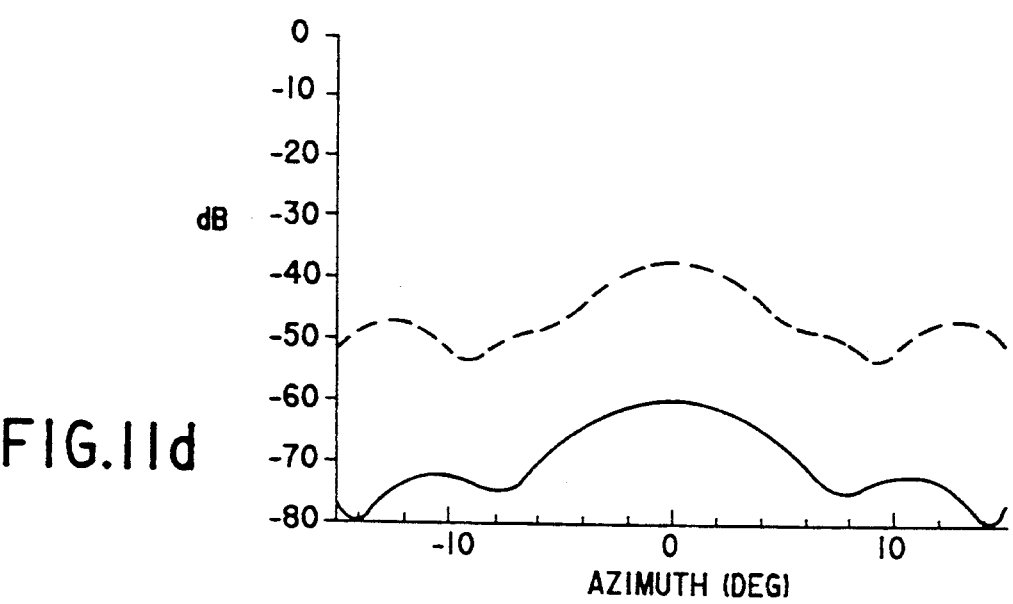
Figure 11E:
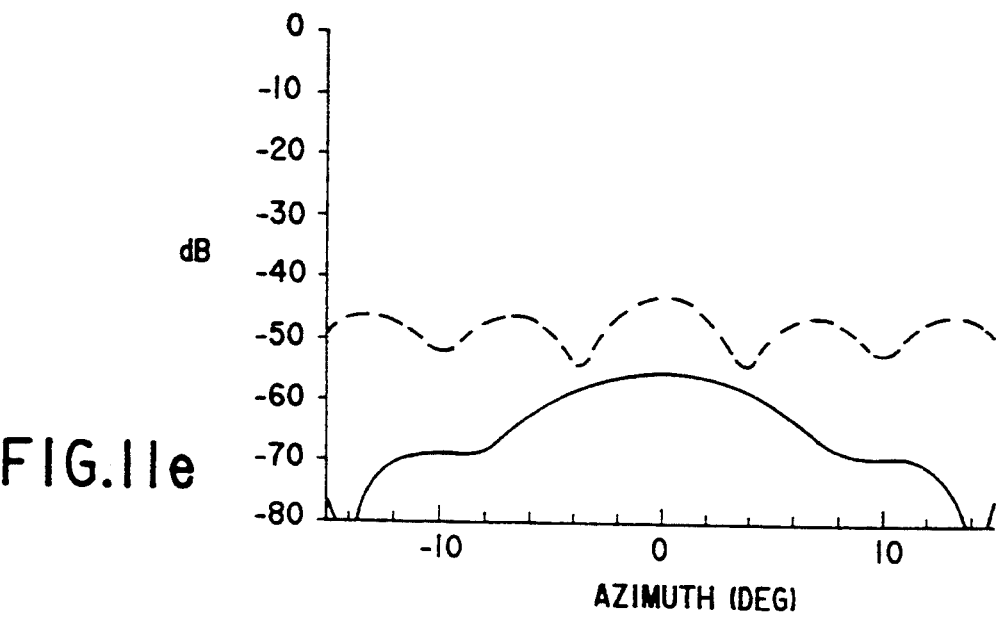

FIG. 10 is a simplified frontal view of the antenna elements of an existing approximately circular array antenna. Each box contains 8 elements on a triangular lattice. There are 20 columns containing from 16 to 64 elements. The interferometer elements are located at the top and bottom of each column. FIG. 11a is a computer-generated 2D plot of elevation antenna patterns of the array of FIG. 10 at 0° azimuth (on-axis) without amplitude or phase errors. Dash line 1110 illustrates the response without hulling, and solid line 1112 illustrates the corresponding response with one sidelobe peak-matched by an interferometer lobe. Null 1114 in response 1112 appears to have a width of about 1° in elevation with about 15 dB of attenuation, and as much as 30 dB of attenuation near $+12°$. FIG. 11b illustrates a corresponding plots at an azimuth angle of 8°, with the un-nulled response illustrated by dash line 1120, and with the nulled response illustrated by solid line 1122. FIG. 11c is a corresponding azimuth antenna pattern of the array antenna of FIG. 10 at an elevation angle of 12.125°. The plot of FIG. 11c is taken through null 1114 of FIG. 11a, and shows that the null has a depth of about 25 dB over an azimuth of about $\pm 15°$. FIG. 11d is a corresponding azimuth pattern at an elevation of 12.25°, and FIG. 11e is similar to FIG. 11d but at 12.5° elevation. The null depth is about 20 dB at 12.25° and as little as 4 dB at 12.5° elevation.

Figure 12A:
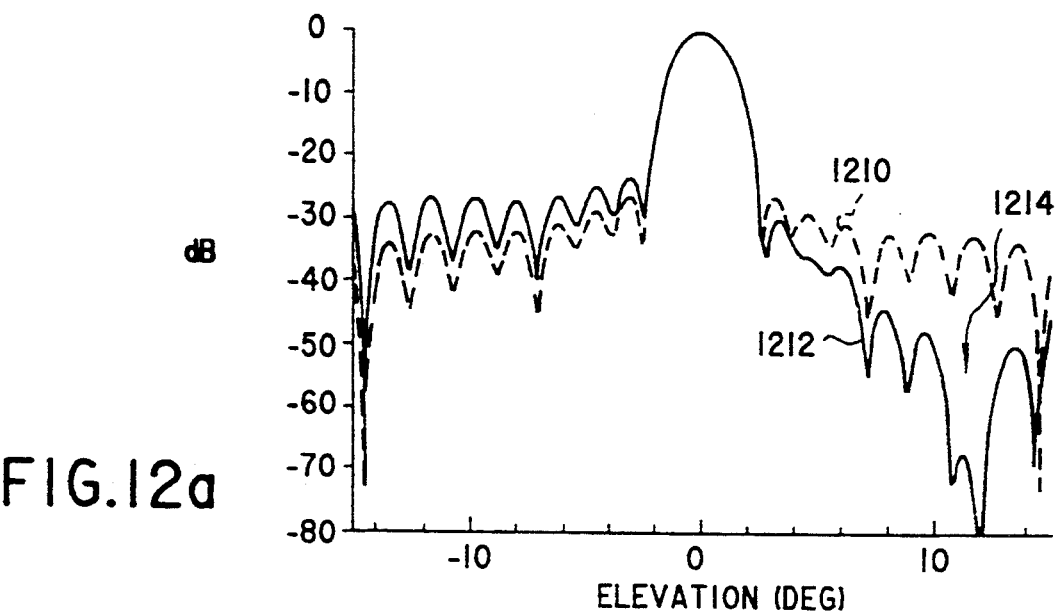
FIG. 12a is a computer-generated two-dimensional plot of elevation antenna patterns of the array of FIG. 10, at 0° azimuth angle, without phase or amplitude errors, in both an un-nulled and in a slope-hulled condition.
Figure 12B:
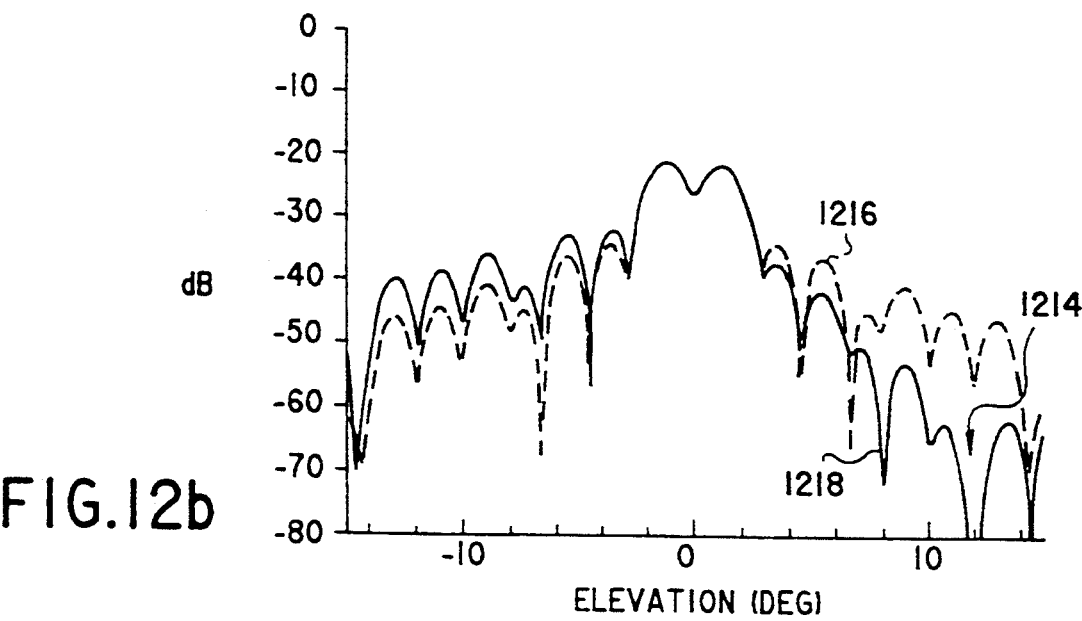
FIG. 12b is a corresponding elevation plot at an azimuth angle of 8°, FIGS. 12c, d and e are corresponding azimuth plots through the null at elevation angles of 12,125°, 12.25° and 12.5°, respectively.
Figure 12C:
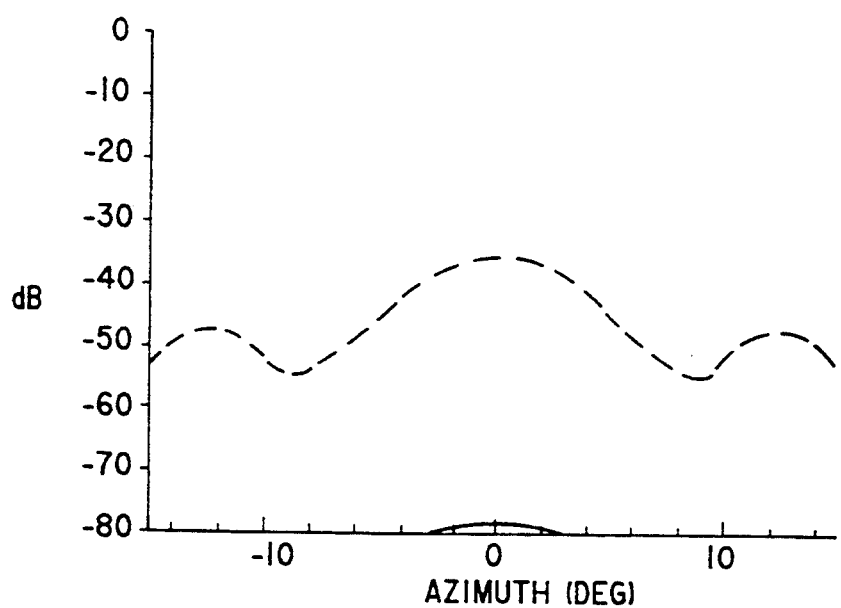
Figure 12D:
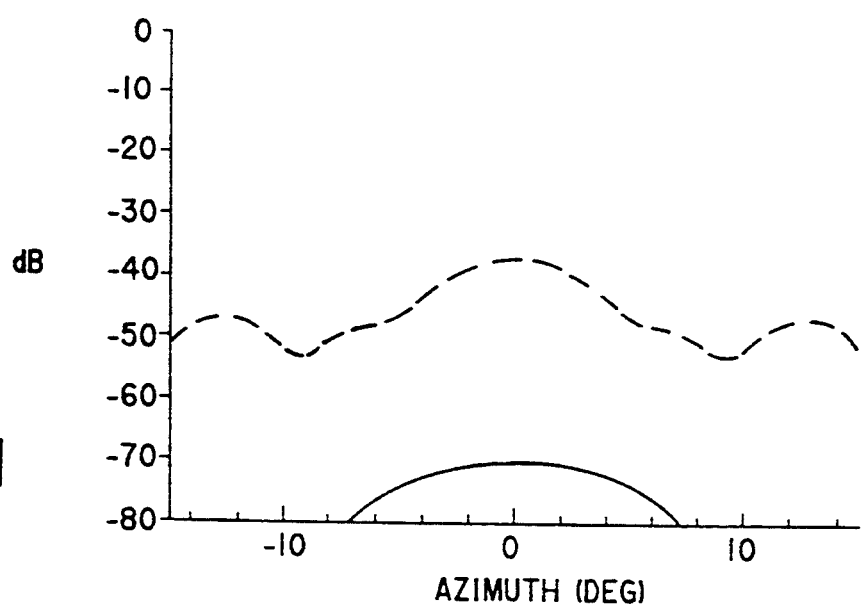
Figure 12E:
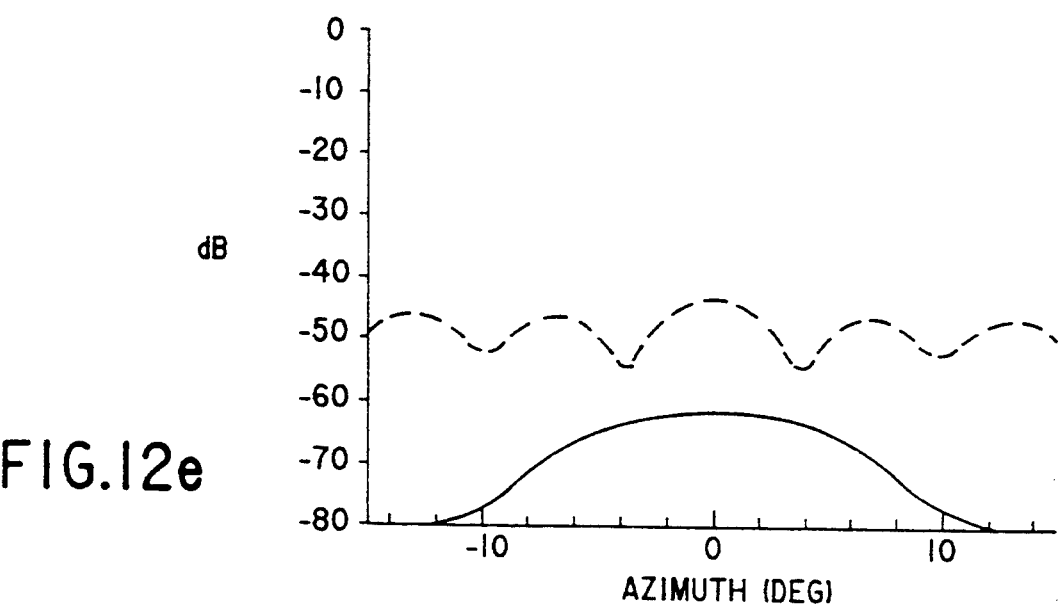

FIG. 12a is a computer-generated 2D plot of elevation antenna patterns of the array of FIG. 10 at 0° azimuth, without amplitude or phase errors. Dash-line 1210 illustrates the response without nulling, which is identical to response 1110 of FIG. 11a. Solid line 1212 illustrates the corresponding response with one sidelobe slope-matched by an interferometer lobe. Null 1214 of FIG. 12a may be directly compared with null 1114 of FIG. 11a, since the only difference lies in peak matching of the sidelobe with the interference lobe in FIG. 11a versus the slope matching on FIG. 12a. FIG. 12b illustrates corresponding plots at an azimuth angle of 8°, the unnulled response being illustrated by dash line 1216, and the slope-matched null response by solid line 1218. FIG. 12c is a corresponding azimuth antenna pattern at an elevation angle of 12.125°, illustrating a null depth of as much as 44 dB. FIG. 12d is an azimuth pattern at an elevation angle of 12.25°, showing a null depth of about 30 dB for companion with the 20 dB of FIG. 11d, and FIG. 12e is an azimuth pattern at an elevation angle of 12.5°, showing a null depth of about 8 dB for slope matching, by comparison with about 4 dB for peak matching as illustrated in FIG. 11e.

Figure 13:
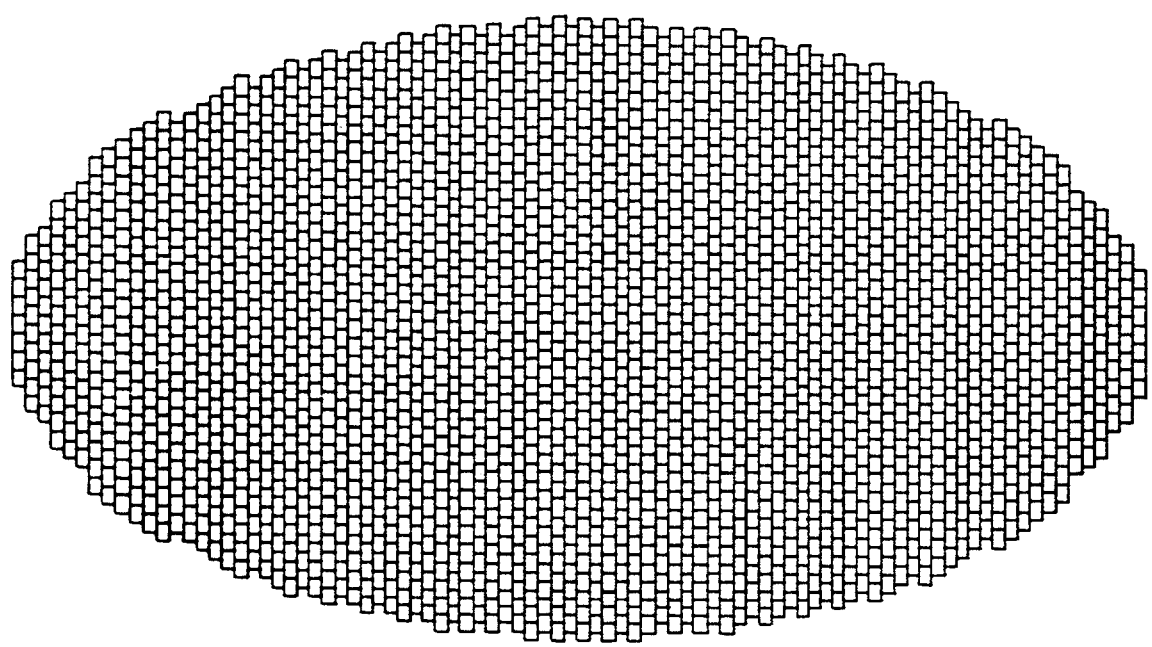
FIG. 13 is a simplified frontal view of an existing array antenna in which vertical line arrays of differing lengths are used to approximate an elliptical array.
Figure 14A:
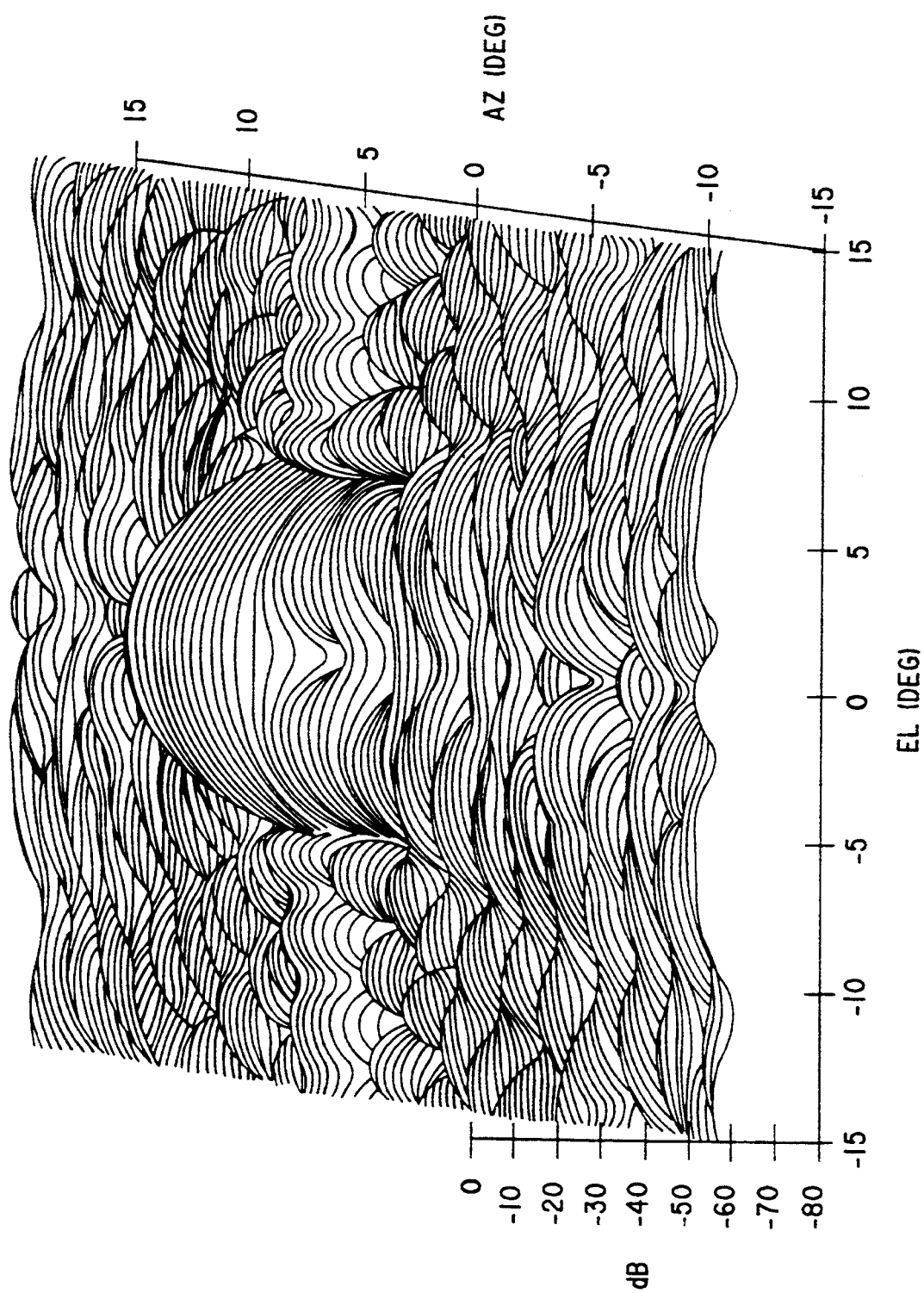
FIG. 14 is a computer-generated three dimensional plot of the radiation pattern of the array of FIG. 13 without phase or amplitude errors, and without nulling.
FIGS. 14b and 14c are corresponding plots of the response hulled by interferometer canceler peak-and slope-matching, respectively.
Figure 14B:
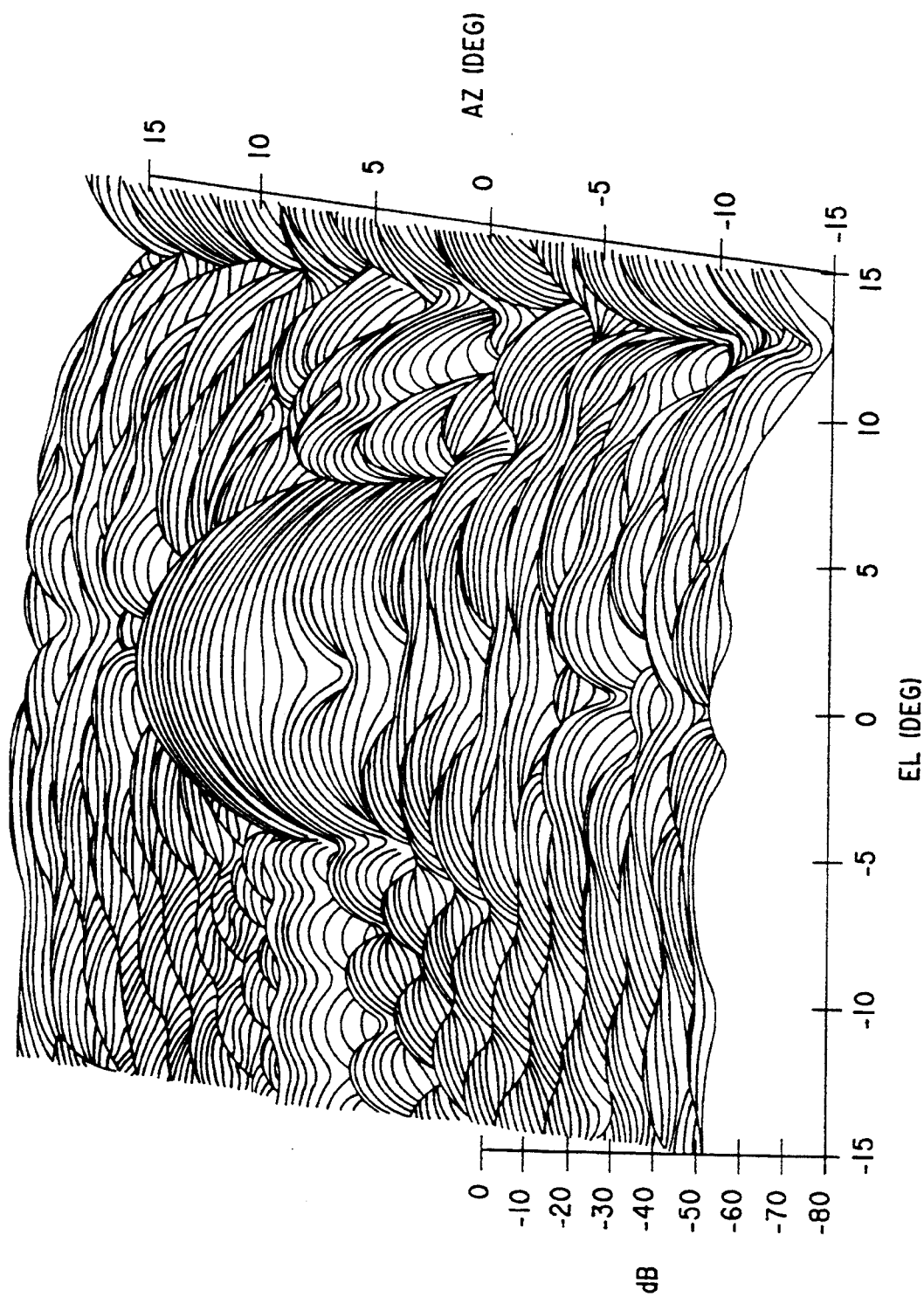
Figure 14C:
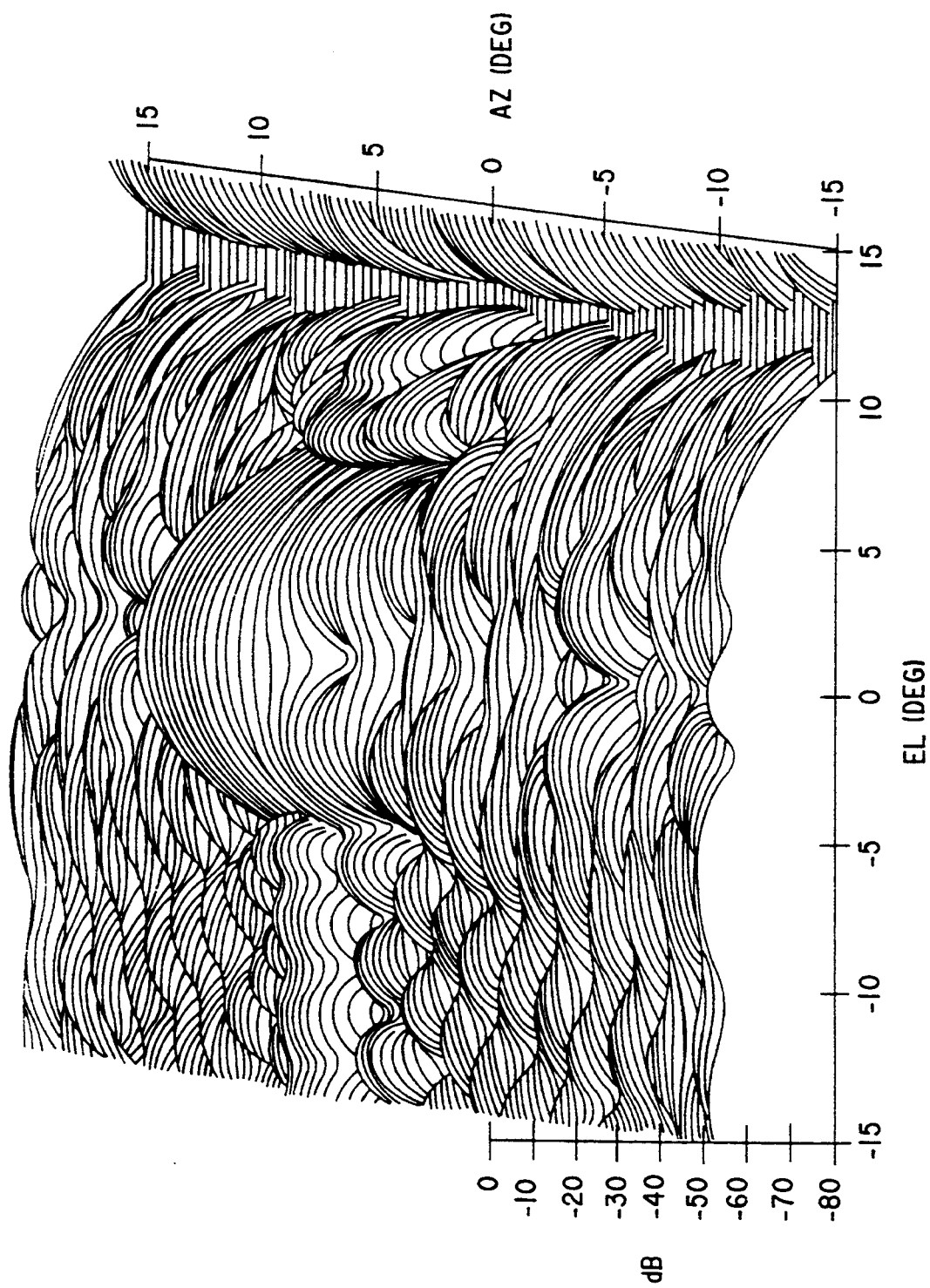

FIG. 13 is a simplified frontal view of an existing elliptical array antenna with 91 columns of from 7 to 35 elements each. FIG. 14a is a representation of a computer-generated 3D plot of the radiation pattern of the array of FIG. 13 without phase or amplitude errors, and without nulling in accordance with the invention. FIG. 14b is a similar representation, with each column of the array of FIGURE associated with an interferometer, and with the interferometers set up to peak-match the column sidelobe nearest 12.25°. As illustrated in FIG. 14b, the null occurring near 12.5° is deep but has portions rising above $-80$ dB (relative to the peak of the main lobe) at various azimuth angles resulting from positioning of the sidelobes which varies from column to column. FIGURE 14c is a similar representation in which slope matching of the interferometer lobes has been used to null at 12.25°. As illustrated, the null exceeds $-80$ dB at all azimuth angles from $-15°$ to 15°. In general, with amplitude and phase errors taken into account, practical useable nulls are obtainable for non-rectangular arrays, which are not as deep, or of a lesser azimuthal extent, than the nulls obtainable with comparable rectangular arrays.

Other embodiments of the invention will be apparent to those skilled in the art. For example, an array according to the invention may use interferometers with more than two elements per column. The array may be the feed for a reflector rather than a direct radiator. While the arrangement of FIG. 3 uses a plurality of column elevation beamformers 200 and a single azimuth beamformer 414, those skilled in the art will realize that the vertical and horizontal axes may be interchanged to produce a plurality of row azimuth beamformers and a single column elevation beamformer.

What is claimed is:

1. A phased-array antenna system, comprising:
   a line array of antenna elements;
   line array feed means coupled to said elements of said line array for producing a scannable directive antenna array beam and plural sidelobes;
   interferometer means including at least two additional antenna elements, said additional antenna elements being mutually spaced and fed by difference feed means connected to at least two of said additional antenna elements for feeding said two of said antenna elements in phase opposition, so as to produce an interferometer beam defining a plurality of lobes;
   interconnection means coupled to said line array feed means and to said interferometer means for feeding said line array feed means and said interferometer means in phase opposition; and
   phase control means coupled to said interferometer means for adjusting the locations of said plurality of lobes, whereby one of said plurality of lobes of said interferometer means may be superposed upon one of said plural sidelobes for cancellation of at least a portion thereof.

2. An antenna system according to claim 1 further comprising subtracting means coupled to said difference feed means and to said line array feed means for causing said at least one of said lobes of said interferometer means to substantially reduce the magnitude of at least one of said sidelobes.

3. A jammer resisting antenna arrangement, comprising:
   a first line array of first antenna elements with a first element-to-element spacing, aid lien array being oriented with its array direction vertical;

first elevation beamforming means including plural distal ports coupled to said first antenna elements of said first line array, and also including a combined port, for generating at said combined port at least one beam which is directive in elevation and which can be scanned in elevation, which beam is associated with a plurality of sidelobes;

first interferometer means including at least second and third antenna elements vertically arrayed with a second element-to-element spacing greater than said first element-to-element spacing, said second and third antenna elements being fed in phase opposition for generating an elevation radiation pattern including a plurality of lobes of substantially equal amplitude;

a second line array of fourth antenna elements with said first element-to-element spacing, said second line array being oriented with its array direction vertical;

second elevation beamforming means including plural distal ports coupled to said fourth antenna elements of said second line array, and also including a combined port, for generating at said combined port at least one beam which is directive in elevation and which can be scanned in elevation, which beam is associated with a plurality of sidelobes;

second interferometer means including at least fifth and sixth antenna elements vertically arrayed with said second element-to-element spacing, said fifth and sixth antenna elements being fed in phase opposition for generating an elevation radiation pattern including a plurality of lobes of substantially equal amplitude;

first subtracting means coupled to said combined port of said first elevation beamforming means and to said first interferometer means for combing the beams formed by said first elevation beamforming means and said first interferometer means in a manner providing cancellation of at least a portion of one of said sidelobes generated by said first beamforming means by one of said lobes of substantially equal amplitude generated by said first interferometer means;

second subtracting means coupled to said combined port of said second elevation beamforming means and to said second interferometer means for combining the beam formed by said second elevation beamforming means and said second interferometer means in a manner providing cancellation of at least a portion of one of said sidelobes generated by said second beamforming means by one of said lobes of substantially equal amplitude generated by said second interferometer means; and azimuth beamforming means including at least first and second separated ports coupled to said first and second subtracting means, respectively, and also including a combined port, said azimuth beamforming means including phase shifters interconnected between said separated ports and said combined port for generating a directive beam scannable in azimuth, whereby said directive beam is scannable in both azimuth and elevation and is associated with sidelobes having a null at a predetermined elevation angel.

4. A jammer resisting antenna arrangement, comprising:

a first line array of first antenna elements with a first element-to-element spacing, said line array being oriented with its array direction horizontal;

first azimuth beamforming means including plural distal ports coupled to said first antenna elements of said first line array, and also including a combined port, for generating at said combined port at lest one beam which is directive in azimuth and which can be scanned in azimuth, which beam is associated with a plurality of sidelobes;

first interferometer means including at least second and third antenna elements horizontally arrayed with a second element-to-element spacing greater than said first element-to-element spacing, said second and third antenna elements being fed in phase opposition for generating an azimuth radiation pattern including a plurality of lobes of substantially equal amplitude;

a second line array of fourth antenna elements with said first element-to-element spacing, said second line array being oriented with its array direction horizontal;

second elevation beamforming means including plural distal ports coupled to said fourth antenna elements of said second line array, and also including a combined port, for generating at said combined port at least one beam which is directive in azimuth and which can be scanned in azimuth, which beam is associated with a plurality of sidelobes;

second interferometer means including at least fifth and sixth antenna elements horizontally arrayed with said second element-to-element spacing, said fifth and sixth antenna elements being fed in phase opposition for generating an azimuth radiation pattern including a plurality of lobes of substantially equal amplitude;

first subtracting means coupled to said combined port of said first azimuth beamforming means and to said first interferometer means for combining the beams formed by said first azimuth beamforming means and said first interferometer means in a manner providing cancellation of at least a portion of one of said sidelobes generated by said first beamforming means by one of said lobes of substantially equal amplitude generated by said first interferometer means;

second subtracting means coupled to said combined port of said second azimuth beamforming means and to said second interferometer means for combining the beam formed by said second azimuth beamforming means and said second interferometer means in a manner providing cancellation of at least a portion of one of said sidelobes generated by said second beamforming means by one of said lobes of substantially equal amplitude generated by said second interferometer means; and elevation beamforming means including at least first and second separated ports coupled to said first and second subtracting means, respectively, and also including a combined port, said elevation beamforming means including phase shifters interconnected between said separated ports and said combined port for generating a directive beam scannable in elevation, whereby said directive beam generated by said elevation beamforming means is scannable in both azimuth and elevation and is associated with sidelobes having a null at a predetermined azimuth angle.

* * * * *